(12) United States Patent  
Jain

(10) Patent No.: US 9,295,939 B2  
(45) Date of Patent: Mar. 29, 2016

(54) CARBON DIOXIDE RECOVERY

(71) Applicant: Innosepra LLC, Bridgewater, NJ (US)

(72) Inventor: Ravi Jain, Bridgewater, NJ (US)

(73) Assignee: Innosepra LLC, Bridgewater, NJ (US)

( * ) Notice: Subject to any disclaimer, the term of this patent is extended or adjusted under 35 U.S.C. 154(b) by 76 days.

(21) Appl. No.: 14/037,764

(22) Filed: Sep. 26, 2013

(65) Prior Publication Data

US 2014/0026750 A1    Jan. 30, 2014

Related U.S. Application Data

(63) Continuation of application No. 12/419,513, filed on Apr. 7, 2009, now Pat. No. 8,591,627.

(60) Provisional application No. 61/123,259, filed on Apr. 6, 2008.

(51) Int. Cl.
| | |
|---|---|
| *B01D 53/04* | (2006.01) |
| *B01D 53/14* | (2006.01) |
| *B01D 53/26* | (2006.01) |
| *B01D 53/047* | (2006.01) |

(52) U.S. Cl.
CPC ............ *B01D 53/0462* (2013.01); *B01D 53/04* (2013.01); *B01D 53/047* (2013.01); *B01D 53/14* (2013.01); *B01D 53/261* (2013.01); *B01D 53/268* (2013.01); *B01D 2257/30* (2013.01); *B01D 2257/404* (2013.01); *B01D 2257/504* (2013.01); *B01D 2257/602* (2013.01); *B01D 2257/80* (2013.01); *Y02C 10/06* (2013.01); *Y02C 10/08* (2013.01); *Y02C 10/10* (2013.01)

(58) Field of Classification Search
CPC ............... B01D 53/04; B01D 53/0454; B01D 53/0462; B01D 53/047; B01D 53/14; B01D 53/26; B01D 53/261; B01D 53/268
USPC ...................... 95/96, 114, 117, 121, 139, 148
See application file for complete search history.

(56) References Cited

U.S. PATENT DOCUMENTS

| | | | |
|---|---|---|---|
| 4,472,178 A | * | 9/1984 | Kumar ............... B01D 53/0462 D53/462 |
| 5,580,369 A | | 12/1996 | Belding et al. |
| 5,650,221 A | | 7/1997 | Belding et al. |
| 5,660,048 A | | 8/1997 | Belding et al. |

(Continued)

*Primary Examiner* — Robert A Hopkins  
(74) *Attorney, Agent, or Firm* — Ash Tankha; Lipton, Weinberger & Husick

(57) ABSTRACT

For separating carbon dioxide ($CO_2$) from a gas stream, a substantially moisture free gas stream is produced using a first temperature swing adsorption (TSA), a first pressure swing adsorption (PSA), a first vacuum swing adsorption (VSA), membrane separation, a first absorption, or any combination thereof. $CO_2$ is captured from the substantially moisture free gas stream and substantially dry $CO_2$ depleted stream is produced using a second TSA, a second PSA, a second VSA, or a second absorption with a non-aqueous solvent with or without a chemical reaction. Adsorbents and/or absorbents used during moisture removal are regenerated using the substantially dry $CO_2$ depleted stream. Purifying a gas stream containing $CO_2$ and impurities includes producing a stream substantially depleted of moisture and impurities using a physical or reactive adsorbent, thermally regenerating the adsorbent to produce a stream substantially enriched in impurities, and removing impurities from the stream substantially enriched in impurities.

22 Claims, 9 Drawing Sheets

(56) References Cited

U.S. PATENT DOCUMENTS

| | | |
|---|---|---|
| 5,685,897 A | 11/1997 | Belding et al. |
| 6,409,801 B1 | 6/2002 | Shen et al. |
| 6,592,651 B2 | 7/2003 | Jain et al. |
| 8,353,978 B2 | 1/2013 | Knaebel |

\* cited by examiner

CARBON DIOXIDE RECOVERY

CROSS REFERENCE TO RELATED APPLICATIONS

This application is a continuation-in-part application of non-provisional patent application Ser. No. 12/419,513 titled "Carbon Dioxide Recovery", filed in the United States Patent and Trademark Office on Apr. 7, 2009.

The specification of the above referenced patent application is incorporated herein by reference in its entirety.

BACKGROUND

The method and system disclosed herein, in general, relates to capturing carbon dioxide ($CO_2$) from combustion sources such as flue gas of a power plant and making the $CO_2$ available for sequestration or other uses.

Emissions of greenhouse gases such as carbon dioxide ($CO_2$), if left unchecked, may potentially affect climatic conditions. Conversion of fossil fuels such as coal and natural gas to energy is a source of greenhouse gas emissions. Emissions of the greenhouse gases can be reduced by various means, for example, increase in efficiency of the combustion process and use of renewable energy such as wind energy and solar energy. However, the reduction in the emission of the greenhouse gases required to stabilize greenhouse gas levels cannot be achieved without capturing a substantial part of the greenhouse gases at the source of the greenhouse gas emissions during either a pre-combustion process or a post combustion process. Post combustion capture of $CO_2$ from flue gas of a power plant or other streams such as flue gas from a refinery involves use of a solvent, typically an amine, which is regenerated using a part of a steam generated during the combustion process. Pre-combustion capture of $CO_2$ involves a chemical reaction of a fuel with air or oxygen and then with steam to produce a mixture of $CO_2$ and hydrogen. The $CO_2$ is removed from this stream through a $CO_2$ capture process and hydrogen may be used as a fuel for power generation. If oxygen is used for combustion, a flue gas containing mainly $CO_2$ is produced which can be easily separated for sequestration.

The post combustion capture of $CO_2$ results in, for example, about a 9%-11% reduction in absolute efficiency for power generation and about 28%-30% reduction in the relative efficiency for a pulverized coal power plant as discussed by Ciferno (Ciferno, J., "A Feasibility Study of Carbon Dioxide Capture from an Existing Coal-Fired Power Plant" paper presented at the Sixth Annual Conference on Carbon Capture and Sequestration, Pittsburgh, Pa., May 2007). A May 2007 National Energy Technology Laboratory (NETL) report, for example, Carbon Sequestration Technology Roadmap and Program Plan—2007, U.S. Department Of Energy (DOE) NETL, May 2007 shows about a 60%-100% increase in cost of power generation for existing power plants taking into account capital and operating costs for $CO_2$ separation and sequestration. Net power output from the power plant is also decreased by 30% or more. Means to significantly decrease the power and capital penalty associated with the post combustion $CO_2$ capture are sought. For the post combustion capture, the U.S. DOE has a goal of less than about a 35% increase in power cost for about 90% $CO_2$ capture.

Most studies dealing with post combustion $CO_2$ capture use amine or ammonia based absorption processes for removal of carbon dioxide ($CO_2$) from flue gas. The absorption based processes have drawbacks such as significant capital and energy requirements. The best amine based absorbents such as the hindered amines and amine blends have an energy requirement in the range of, for example, about 750-900 Kcal/kg (1,350-1,620 Btu/lb) of the $CO_2$ captured. Furthermore, amine based processes require the use of specialty steel equipment and associated capital investment because of the corrosive nature of amine and ammonia solutions in the presence of acidic gases and oxygen. This specialty steel equipment represents a significant capital cost.

Absorption systems that do not involve an aqueous amine have been proposed. These absorption systems include $CO_2$ binding organic liquids such as those described by Heldebrandt et al. (Heldebrandt, D. J., C. R. Yonker, P. G. Jessop, and L. Phan, Organic Liquid $CO_2$ Capture Agents with High Gravimetric $CO_2$ Capacity, Energy Environ Sci, v1, p 487-493, 2008; and Heldebrandt, D. J., P. K. Koech, J. E. Rainbolt, F. Zheng, T. Smurthwaite, C. J. Freeman, M. Oss, and I. Leito, Performance of Single Component $CO_2$ Binding Organic Liquids ($CO_2$BOLs) for Post Combustion $CO_2$ Capture, Chem Eng J., v171, p'794-800, 2011). The absorption systems also include physical and chemical ionic liquids as discussed in reviews by Zhang et al. (Zhang, X., X. Zhang, H. Dong, Z. Zhao, S. Zhang, and Y. Huang, Carbon Capture with Ionic Liquids: Overview and Progress, Energy Environ Sci, v5, p 6668, 2012.) and Ramdin et al. (Ramdin, M., T. W. de Loos, and T. J. H. Vlugt, State of the Art $CO_2$ capture with Ionic Liquids, Ind Eng Chem Res, v51, p 8149, 2012.). In many cases, these solvents could perform better provided the amount of water and acid gases such as sulfur oxide ($SO_x$) in the feed was significantly lower than that contained in a typical flue gas.

In contrast to the amine based systems, the heats of adsorption of $CO_2$ on various zeolite and carbon based adsorbents range, for example, between 140-240 kcal/kg or 252-432 Btu/lb (Valenzuela, D. P. and A. L Myers, "Adsorption Equilibrium Data Handbook", Prentice Hall, Englewood Cliffs, N.J., 1989), which is about a fifth of the total energy needed for the amine based systems. There is an unmet need for practical adsorption systems that can take advantage of low heats of adsorption while providing high carbon dioxide yield and high recovery.

Temperature swing adsorption systems have been used extensively for applications such as air drying, natural gas drying, and water and $CO_2$ removal prior to cryogenic distillation of air. These temperature swing adsorption systems typically remove less than about 2% of impurities and the regeneration outlet stream containing the impurities is not of high purity. Also, the typical temperature swing adsorption processes have adsorption times of the order of about 4 hours to about 12 hours. For feed $CO_2$ concentrations between about 10% to about 12% in the flue gas, these adsorption times would require extremely large adsorption beds. For example, assuming a working capacity of 12 weight % (difference in capacity between the adsorption and the regeneration steps), an adsorbent density of about 660 kgs/m³, and an adsorption time of 4 hours, a plant processing 1000 tons/day of $CO_2$ in the feed would require about 8,000 m³, that is, 5.3 million kilograms of the adsorbent, a size that makes these systems not practical for capturing $CO_2$ from combustion sources.

Vacuum swing adsorption (VSA) systems for $CO_2$ recovery from flue gas have been proposed (Zhang, J., P. Xiao, G. Li, and P. A. Webley, Effect of Flue Gas Impurities on $CO_2$ Capture Performance from Flue Gas at Coal Fired Power Stations by Vacuum Swing Adsorption, Energy Procedia, v1, p 1115, 2009; and Zhang, J., P. A. Webley, and P. Xiao, Effect of Process Parameters on Power Requirements of Vacuum Swing Adsorption Technology for $CO_2$ Capture from Flue Gas, Energy Conversion and Management, v49, p 346, 2008). These vacuum swing adsorption systems typically have low adsorbent utilization leading to large systems, lower recovery and purities, and are impacted significantly by flue gas impurities such as water and $SO_X$. These vacuum swing adsorption systems can benefit significantly from removal of water and acid gas impurities from flue gas prior to $CO_2$ adsorption as impurities such as $SO_X$ are difficult to remove under vacuum swing adsorption operating conditions.

Hence, there is a long felt but unresolved need for an efficient capture of $CO_2$ using a method based on temperature and pressure swing adsorption cycles either alone or in combination with other $CO_2$ separation processes.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and system disclosed herein addresses the above mentioned need for an efficient capture of carbon dioxide ($CO_2$) using a method based on temperature and pressure swing adsorption cycles either alone or in combination with other $CO_2$ separation processes. High purity carbon dioxide, that is, carbon dioxide containing not more than about 10 percent by volume of impurities, is produced by subjecting a $CO_2$ stream containing impurities to a combination of a temperature swing adsorption (TSA) process and a pressure swing adsorption (PSA) process either alone or in combination with other $CO_2$ separation processes. The concentration of the $CO_2$ in the feed gas stream is, for example, about 3% to about 60% by volume.

Disclosed herein is a method for separating carbon dioxide ($CO_2$) from a gas stream containing moisture and impurities. The gas stream comprises a flue gas, for example, from a coal fired power plant, a natural gas fired power plant, a refinery, etc. The impurities that are removed from the $CO_2$ containing gas stream comprise, for example, hydrocarbons, oxygen, nitrogen, argon, sulfur oxides, mercury, etc. The method disclosed herein comprises removing the moisture from the gas stream, capturing $CO_2$, and regenerating the adsorbents or the absorbent one or more times. In the method disclosed herein, moisture is substantially removed from the gas stream using a first temperature swing adsorption, a first pressure swing adsorption or a vacuum swing adsorption, membrane separation, a first absorption, or any combination thereof, to produce a substantially moisture free gas stream. As used herein, the term "temperature swing adsorption" refers to adsorption at a given temperature and then regeneration of an adsorbent bed that is loaded with a targeted impurity gas by increasing the temperature. Also, as used herein, the term "pressure swing adsorption" refers to a method of adsorption used to separate a gas from a mixture of gases under pressure according to molecular characteristics of the gas and affinity of the gas for an adsorbent material, and change in system pressure during regeneration of the adsorbent material. As used herein, the term "vacuum swing adsorption" refers to a method of adsorption used to separate a gas from a mixture of gases, where the gases are adsorbed under pressure and the pressure of the adsorbent bed is changed to below atmospheric pressure, that is, vacuum pressure during regeneration. Also, as used herein, the term "membrane separation" refers to a method for selectively separating or fractionating materials via differences in permeabilities through a membrane structure.

The first temperature swing adsorption is carried out using a fixed bed adsorber or a rotating bed adsorber. In the fixed bed adsorber, the adsorbent bed is stationary during both adsorption and regeneration stages, whereas in the rotating bed adsorber, the adsorbent bed rotates and moves through the adsorption and regeneration stages in a given amount of time. The duration of the first temperature swing adsorption for removal of the moisture from the gas stream is, for example, about 0.1 hour to about 12 hours. The duration of the first pressure swing adsorption for removal of the moisture from the gas stream is, for example, about 4 minutes to about 60 minutes. The moisture removal can be performed, for example, by a membrane, an adsorption, or an absorption process. Adsorbents used for removal of the moisture from the gas stream comprise, for example, one or more of an activated alumina, a silica gel, or a molecular sieve such as a 3A, 4A, 5A and 13X zeolite. The moisture content in the gas stream is reduced to a dew point of, for example, about −40° C. to about −80° C. during removal of the moisture from the gas stream. The adsorption is generally carried out in a gaseous phase at temperatures between about 10° C. and about 80° C. and at pressures, for example, about 1.07 bar absolute to about 40.0 bar absolute.

After substantially removing moisture from the gas stream, the $CO_2$ from the substantially moisture free gas stream is captured, for example, by a second temperature swing adsorption, a second pressure swing adsorption, a second vacuum swing adsorption, or a second absorption with a non-aqueous solvent with or without a chemical reaction, and a substantially dry $CO_2$ depleted stream is produced. The second temperature swing adsorption is conducted in an adsorbent bed comprising an adsorbent. After the adsorption step, the second temperature swing adsorption comprises heating the adsorbent bed to produce a substantially moisture free $CO_2$ stream. In an embodiment, the adsorbents used in the second temperature swing adsorption are regenerated by heating the adsorbent bed indirectly using steam or a hot fluid in a heat exchanger. Further, $CO_2$ removal can be performed, for example, by evacuation after heating. The duration of the second temperature swing adsorption for the capture of the $CO_2$ from the substantially moisture free gas stream is, for example, about 2 minutes to about 60 minutes. The second pressure swing adsorption and the second vacuum swing adsorption are conducted in an adsorbent bed comprising an adsorbent. In an embodiment, the regeneration of the adsorbent bed comprises reducing pressure in the adsorbent bed to, for example, between about 0.01 atmosphere (atm) and about 1 atm, to produce a substantially moisture free $CO_2$ stream. The adsorbent for adsorbent based $CO_2$ capture comprises, for example, one or more of an activated carbon, carbon molecular sieves, 4A, 5A, 13X, NaY and CaX zeolites, metallorganic framework compounds, natural zeolites, modified natural and synthetic zeolites, modified activated carbon, and pillared clays. The adsorbents used for removal of the moisture and capture of the $CO_2$ are, for example, in a particulate form or a structured form. The second absorption step is performed using an absorbent, for example, an ionic liquid or a non-aqueous solvent to produce a substantially pure $CO_2$ stream during regeneration of the absorbent. The purity of the substantially moisture free $CO_2$ stream produced during the second absorption or the second adsorption is, for example, about 90% to about 99%.

The temperature during the regeneration of the adsorbents, for example, in the second temperature swing adsorption or the second absorption step is increased, for example, from about 80° C. to about 300° C. In absorption embodiments, the substantially pure $CO_2$ stream can be produced at a pressure higher than one atmosphere, for example, between about 1 atm and about 10 atm, by heating the absorbent indirectly in a heat exchanger. The adsorbents and/or the absorbents used during the removal of moisture are regenerated using the substantially dry $CO_2$ depleted stream produced by the $CO_2$ capture step.

Disclosed herein is also a method for purifying a gas stream containing $CO_2$ and impurities, for example, hydrocarbons, oxygen, nitrogen, argon, sulfur oxides, mercury, etc. In the purification method disclosed herein, moisture and impurities comprising, for example, sulfur oxides and mercury are substantially removed from the gas stream using a physical adsorbent or a reactive adsorbent to produce a stream substantially depleted of moisture and impurities. $CO_2$ is not removed substantially during this step. Adsorption can also be used to remove other impurities such as hydrocarbons. The adsorbent is thermally regenerated using the stream substantially depleted of moisture and impurities to produce a stream substantially enriched in sulfur oxides and mercury. The adsorbents are thermally regenerated, for example, by indirectly heating the adsorbent bed. The temperature during the thermal regeneration of the adsorbents is increased, for example, from about 80° C. to about 300° C. The impurities are substantially removed from the stream substantially enriched in sulfur oxides and mercury using an existing feed conditioning unit or a new feed conditioning unit.

In an embodiment, the stream substantially depleted of moisture and impurities, after the first adsorption step, is subjected to a second temperature swing adsorption, a second pressure swing adsorption, a second vacuum swing adsorption, and a second absorption with a non-aqueous solvent with or without a chemical reaction, to produce a substantially dry $CO_2$ depleted stream and a substantially pure $CO_2$ product stream. The substantially dry $CO_2$ depleted stream from the $CO_2$ separation section is used for the thermal regeneration of the moisture and impurities removal section. The substantially dry $CO_2$ depleted stream from the $CO_2$ separation section or the non-adsorbed stream produced during removal of moisture, hydrocarbons, sulfur oxides, and mercury is used for the regeneration of the moisture and impurities removal section. The stream produced during regeneration which is substantially enriched in impurities such as sulfur oxides and mercury is sent to an existing feed conditioning unit or a new feed conditioning unit for nearly complete removal of these impurities.

In an embodiment, the impurities comprising, for example, moisture, hydrocarbons, sulfur oxides, and mercury are removed prior to $CO_2$ separation, during removal of the moisture from the gas stream. The adsorbents used for removal of the impurities from the gas stream comprise, for example, one or more of an activated carbon, 13X zeolites, A zeolites, an AW-300 zeolite, an AW-500 zeolite, impregnated aluminas, modified activated carbons, and silicates. The adsorbents used for removal of the impurities from the gas stream are, for example, in a particulate form or a structured form. The adsorbents used for removal of the impurities from the gas stream are used in a fixed bed adsorber or a rotating bed adsorber.

In embodiments involving $CO_2$ capture, the $CO_2$ produced can be further purified, for example, by a membrane, adsorption, distillation, or a getter. Part of the purified $CO_2$ can be used as a rinse in the $CO_2$ adsorption section. The methods disclosed herein are effective for removal of, for example, about 80% or higher amounts by volume of impurities from the $CO_2$ containing gas stream.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
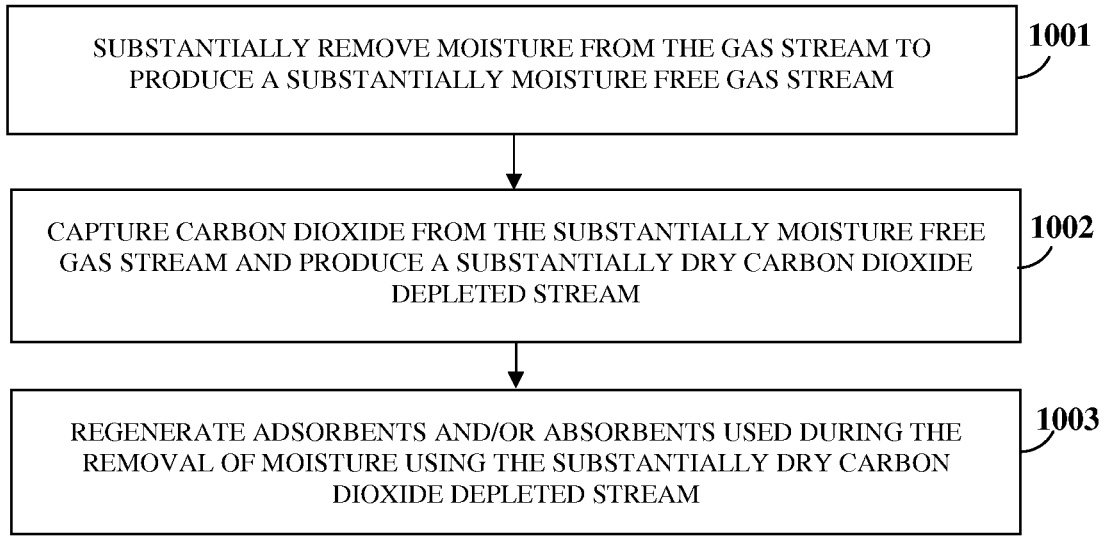
FIG. 1 illustrates a method for separating carbon dioxide from a gas stream containing moisture and impurities.

FIG. 1 illustrates a method for separating carbon dioxide ($CO_2$) from a gas stream containing moisture and impurities. The gas stream comprises a flue gas, for example, from a coal fired power plant, a natural gas fired power plant, or a refinery. Pressure of the gas stream is, for example, about 1.07 bar absolute (bara) to about 40 bar absolute. Concentration of the $CO_2$ in the feed gas stream is, for example, about 3% to about 60% by volume. The temperature of the gas stream is, for example, about 10° C. to about 80° C. The method disclosed herein comprises removing moisture from the gas stream, capturing $CO_2$, and regenerating adsorbents and/or absorbents one or more times. In the method disclosed herein, moisture is substantially removed 1001 from the gas stream using a first temperature swing adsorption, a first pressure swing adsorption, a first vacuum swing adsorption, membrane separation, a first absorption, or any combination thereof, to produce a substantially moisture free gas stream. As used herein, the term "temperature swing adsorption" refers to adsorption at a given temperature and then regeneration of an adsorbent bed that is loaded with a targeted impurity gas by increasing the temperature. Also, as used herein, the term "pressure swing adsorption" refers to a method of adsorption used to separate a gas from a mixture of gases under pressure according to molecular characteristics of the gas and affinity of the gas for an adsorbent material, and change in system pressure during regeneration of the adsorbent material. Also, as used herein, the term "vacuum swing adsorption" refers to a method of adsorption used to separate a gas from a mixture of gases, where the gases are adsorbed under pressure and the pressure of the adsorbent bed is changed to below atmospheric pressure, that is, vacuum pressure during regeneration. Also, as used herein, the term "membrane separation" refers to a method for selectively separating or fractionating materials via differences in permeabilities through a membrane structure. The moisture can be reduced to low levels, below a dew point of, for example, about −40° C., using a combination of adsorption based processes or bulk moisture can be removed by a membrane or an absorption based process followed by an adsorption based process for moisture removal to low levels. The adsorbent used for removal of the moisture from the gas stream comprises, for example, one or more of an activated alumina, a silica gel, and a molecular sieve such as a 3A, 4A, 5A and 13X zeolite.

The first temperature swing adsorption is carried out, for example, using a fixed bed adsorber or a rotating bed adsorber during removal of the moisture. In the fixed bed adsorber, the adsorbent bed is stationary during both adsorption and regeneration stages, whereas in the rotating bed adsorber, the adsorbent bed rotates and moves through the adsorption and regeneration stages in a given amount of time. The duration of the first temperature swing adsorption for removal of the moisture from the gas stream is, for example, about 0.1 hour to about 12 hours. The duration of the first pressure swing adsorption for removal of the moisture from the gas stream is, for example, about 4 minutes to about 60 minutes. The moisture content in the gas stream is reduced to a dew point of, for example, about −40° C. to about −80° C. or below during removal of the moisture from the gas stream. In an embodiment, during removal of the moisture from the gas stream, the impurities comprising, for example, hydrocarbons, sulfur oxides, and mercury are removed from the gas stream. The moisture and impurities removal process employing a temperature swing adsorption, a pressure swing adsorption, and a vacuum swing adsorption is disclosed in the detailed description of FIG. 5.

After removal of the moisture, the $CO_2$ is captured 1002 from the substantially moisture free gas stream, for example, by a second temperature swing adsorption, a second pressure swing adsorption, a second vacuum swing adsorption, and a second absorption with a non-aqueous solvent with or without a chemical reaction, and a substantially dry $CO_2$ depleted stream is produced. In an embodiment, the second absorption is performed using an absorbent comprising, for example, an ionic liquid or a non-aqueous solvent to produce a substantially pure $CO_2$ stream during regeneration of the absorbent. The purity of the substantially moisture free $CO_2$ stream produced during the second absorption or the second adsorption is, for example, about 90% to about 99%. The substantially pure $CO_2$ stream is produced at a pressure higher than one atmosphere, for example, at about 1 atmosphere (atm) to about 10 atm, for example, by heating the absorbent indirectly in a heat exchanger.

In an embodiment, the second temperature swing adsorption is conducted in an adsorbent bed comprising an adsorbent. After the adsorption step, the second temperature swing adsorption comprises heating the adsorbent bed to produce a substantially moisture free $CO_2$ stream. In an embodiment, the adsorbents in the second temperature swing adsorption are regenerated by heating the adsorbent bed indirectly using steam or a hot fluid in a heat exchanger. Further, $CO_2$ removal can be performed by evacuation after heating. The duration of the second temperature swing adsorption for the $CO_2$ capture from the substantially moisture free gas stream is, for example, about 2 minutes to about 60 minutes. The second pressure swing adsorption and the second vacuum swing adsorption are conducted in an adsorbent bed comprising an adsorbent. The regeneration of the adsorbent bed comprises reducing pressure in the adsorbent bed to, for example, between about 0.01 atm and about 1 atm to produce the substantially moisture free $CO_2$ stream. The adsorbent for the adsorbent based $CO_2$ capture comprises, for example, one or more of an activated carbon, carbon molecular sieves, 4A, 5A, 13X, NaY and CaX zeolites, metallorganic framework compounds, natural zeolites, modified natural and synthetic zeolites, modified activated carbon, and pillared clays. The adsorbents used for removal of the moisture from the gas stream and the capture of $CO_2$ are, for example, in a particulate form or a structured form. Different embodiments of the method for separating $CO_2$ are disclosed in the detailed description of FIG. 3, FIGS. 4A-4E, and FIG. 6.

In the method disclosed herein, the adsorbents and/or absorbents used during removal of moisture are regenerated 1003 using the substantially dry $CO_2$ depleted stream produced by the $CO_2$ capture step 1002. The temperature during the regeneration of the adsorbents, for example, in the second temperature swing adsorption step or the absorption step is increased, for example, from about 80° C. to about 300° C. In an embodiment, the regeneration of the adsorbents comprises heating the adsorbent bed indirectly using steam or a hot fluid in a heat exchanger for producing a substantially dry $CO_2$ stream.

Figure 2:
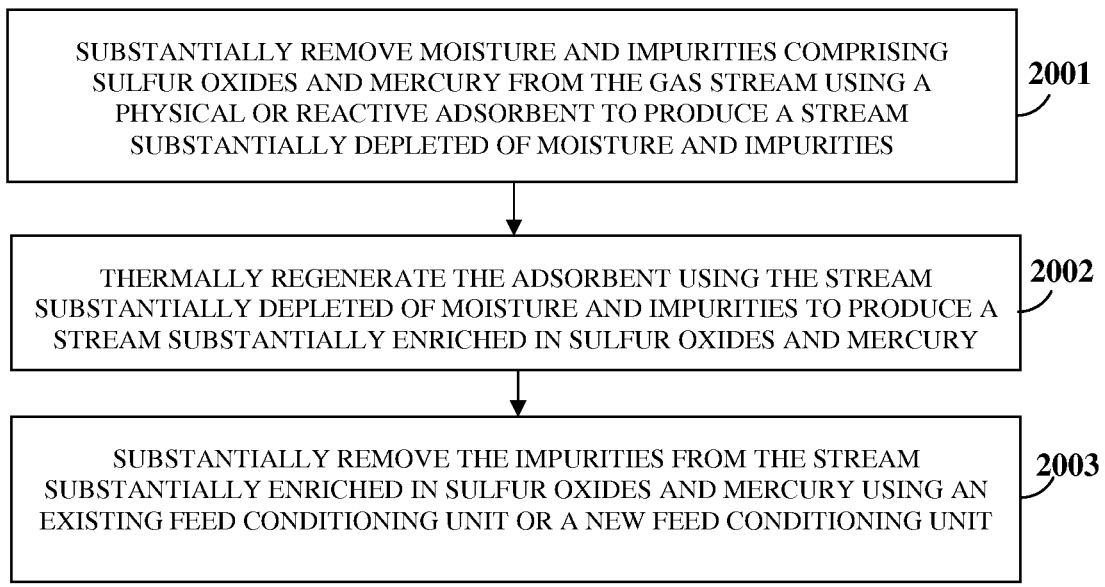
FIG. 2 illustrates a method for purifying a gas stream containing carbon dioxide and impurities.

FIG. 2 illustrates a method for purifying a gas stream containing carbon dioxide ($CO_2$) and impurities, for example, hydrocarbons, oxygen, nitrogen, argon, sulfur oxides, and mercury. In the method disclosed herein, moisture and impurities comprising, for example, sulfur oxides and mercury are substantially removed 2001 from the gas stream. This removal of impurities is performed using, for example, a physical adsorbent or a reactive adsorbent to produce a stream substantially depleted of moisture and impurities. The adsorbents used for removal of hydrocarbons, sulfur oxides, and mercury from the gas stream comprise, for example, one or more of an activated carbon, 13X zeolites, A zeolites, an AW-300 zeolite, an AW-500 zeolite, impregnated aluminas, modified activated carbons, and silicates. The adsorbents used for removal of impurities are, for example, in a particulate form or a structured form. The adsorbents are used, for example, in a fixed bed adsorber or a rotating bed adsorber. In the method disclosed herein, the adsorbent is thermally regenerated 2002 using the stream substantially depleted of moisture and impurities to produce a stream substantially enriched in sulfur oxides and mercury. The temperature during the thermal regeneration of the adsorbents is increased, for example, from about 80° C. to about 300° C. In an embodiment, the adsorbents used during the removal of impurities are thermally regenerated using the substantially dry impurity depleted stream. This can be the non-adsorbed stream produced during removal of the impurities. The stream, substantially depleted of moisture and impurities, is optionally subjected, for example, to a second temperature swing adsorption, a second pressure swing adsorption, a second vacuum swing adsorption, and a second absorption with a non-aqueous solvent with or without a chemical reaction, to produce a substantially dry $CO_2$ depleted stream and a substantially pure $CO_2$ product stream. The substantially dry $CO_2$ depleted steam from this step can also be used to regenerate the beds in the impurities removal step. In the method disclosed herein, impurities are substantially removed 2003 from the stream substantially enriched in sulfur oxides and mercury using an existing feed conditioning unit or a new feed conditioning unit as disclosed in the detailed description of FIG. 3.

Figure 3:
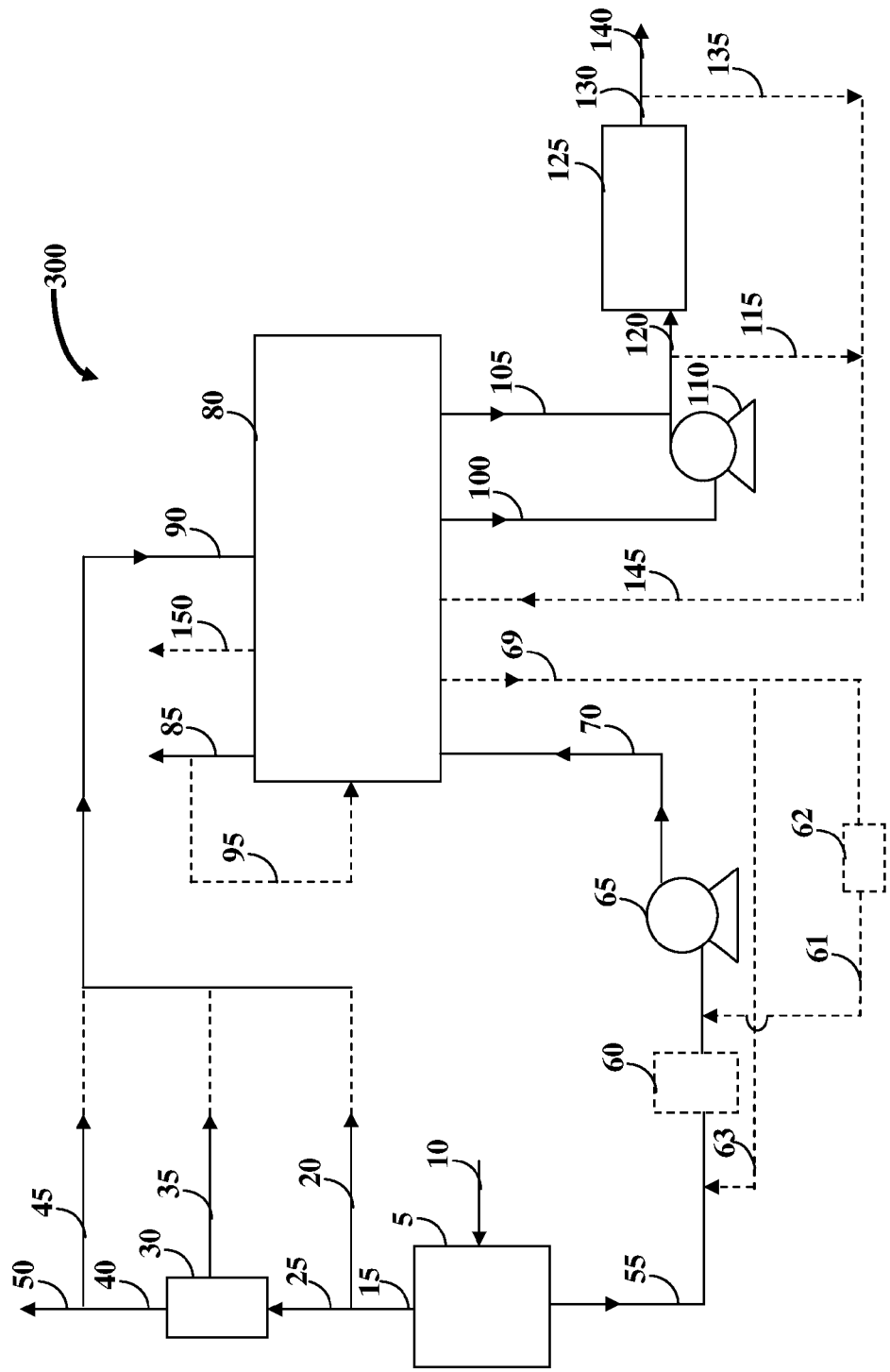
FIG. 3 exemplarily illustrates a schematic of a system for recovering high purity carbon dioxide from a feed stream containing carbon dioxide.

FIG. 3 exemplarily illustrates a schematic of a system 300 for recovering high purity carbon dioxide ($CO_2$) from a feed stream 70 containing $CO_2$. The system 300 disclosed herein comprises a $CO_2$ separation system 80 as exemplarily illustrated in FIG. 3. The $CO_2$ is generated in a unit 5, for example, by a combustion process or another process that generates $CO_2$. If a combustion process is used to generate $CO_2$, an oxygen enriched stream 10 can be optionally used during the combustion process to improve combustion efficiency and to increase the concentration of $CO_2$ resulting from combustion. Using heat generated in the unit 5, steam can be generated as stream 15. A part of stream 15 can be taken as stream 20 and used in the $CO_2$ separation system 80. The remaining part of stream 15 is taken off as stream 25 and can be used for other uses such as power generation or for production of synthesis gas in a unit 30. Stream 35, a low pressure stream or hot water, from the unit 30 can be used in the $CO_2$ separation system 80 or can be sent to the unit 5 for generating steam. A portion 40 of electrical power generated in the unit 30 can be sent to the $CO_2$ separation system 80 via line 45.

The remaining electrical power can be supplied to end users such as industrial and residential customers through line 50. A $CO_2$ containing stream 55, for example, flue gas leaves the unit 5. After removing particulates, the $CO_2$ containing stream 55 can be optionally sent to an optional feed conditioning unit 60 to remove impurities such as the oxides of nitrogen and sulfur, and mercury. The pressure of the $CO_2$ containing stream 55 containing residual sulfur and nitrogen oxides, mercury, nitrogen, oxygen, and argon as the main impurities can be raised, if needed, by a fan or a blower 65 positioned after the feed conditioning unit 60. If the $CO_2$ containing stream 55 is from a chemical plant or a refinery or from a pre-combustion process, then the $CO_2$ containing stream 55 may contain impurities such as hydrogen, hydrocarbons, and carbon monoxide. For a coal or a natural gas fired power plant, the pressure of the flue gas will typically be raised to, for example, between about 1.07 bar absolute (bara) to about 1.34 bara. For the $CO_2$ containing stream 55 generated in chemical or industrial processes, the pressure of the $CO_2$ containing stream 55 may be higher than about 1.07 bara to about 1.34 bara and may not have to be raised. In a gasification process, where the fuel is gasified with air or oxygen, the pressure of the $CO_2$ containing stream 55 may be several atmospheres and would not have to be raised. In an oxy-combustion process, the flue gas may be recycled to the unit 5 or a combustion system to increase the concentration of $CO_2$. After removal of nitrogen oxides, sulfur oxides, and mercury, and compression, the $CO_2$ containing stream 55 would typically be cooled in a flue gas cooling unit (not shown) to, for example, between near ambient temperature and about 60° C. prior to $CO_2$ capture. Many power plants have existing processes and systems for removal of particulates, nitrogen oxides, and sulfur oxides. These processes and systems comprise, for example, selective catalytic reduction (SCR) for nitrogen oxides, electrostatic precipitators for the particulates, and wet scrubbers for sulfur oxides. Removal of the particulates, nitrogen oxides, and sulfur oxides may not be necessary, if the $CO_2$ containing stream 55 comes from a process such as partial oxidation or reforming.

The $CO_2$ containing stream 55 leaves the fan or the blower 65 as feed stream 70 and enters the $CO_2$ separation system 80. The $CO_2$ separation system 80 contains at least one bed with a material that removes $CO_2$ from the feed stream 70 by adsorption, or by absorption with a non-aqueous solvent. Both physical or reactive absorption and adsorption can be used. The pressure of the bed ranges from, for example, about 1.07 bara to about 40 bara. Depending on the material used for $CO_2$ capture, the $CO_2$ separation system 80 may contain additional units for removal of other components in the feed stream 70 such as moisture, residual sulfur oxides, and mercury. If a material such as a zeolite is used for $CO_2$ capture by adsorption, or a non-aqueous solvent is used, the moisture from the feed stream 70 would have to be removed prior to $CO_2$ separation and the $CO_2$ depleted stream 85 would be relatively dry. In this case, stream 95, a part of the $CO_2$ depleted stream 85, or the entire $CO_2$ depleted stream 85, can be used for regenerating the moisture removal system.

The $CO_2$ captured in the $CO_2$ separation system 80 is recovered by desorbing the $CO_2$. The energy for $CO_2$ recovery can be provided, for example, by stream 20, stream 35, or electricity represented by stream 45. Other external sources of heat and electricity can also be used for regenerating the material in the $CO_2$ separation system 80. The adsorbent or reactant can be regenerated, for example, by the dry $CO_2$ depleted stream 85 which is heated, for example, with steam, hot water, or electricity. The adsorbent or absorbent material can also be regenerated by heating the material indirectly using steam or hot water. Typically, the regeneration of the moisture adsorption material and the $CO_2$ separation material in the $CO_2$ separation system 80 would be performed in parallel to ensure that the $CO_2$ leaving the $CO_2$ separation system 80 is dry. In addition to heat, a vacuum pump 110 may be used to remove $CO_2$ from the $CO_2$ separation system 80. In pressure and vacuum swing adsorption embodiments of the $CO_2$ separation system 80, the $CO_2$ is recovered by decreasing the pressure, for example, between about 0.01 atm and about 1 atm. The stream used for regeneration is depicted as stream 90. More than 80% of the impurities are typically removed in the $CO_2$ separation system 80.

The desorbed $CO_2$ exits the $CO_2$ separation system 80 via line 105 and is sent to a $CO_2$ purification system 125. For both the absorption and adsorption embodiments, some or all the $CO_2$ can be produced at pressure under appropriate regeneration conditions. An optional vacuum pump 110 may be used to facilitate the recovery of $CO_2$ from the $CO_2$ separation system 80. Part of the $CO_2$ product enters the vacuum pump 110 as stream 100 and joins stream 105 after exiting the vacuum pump 110. The stream 105 and the stream exiting the vacuum pump 110 are combined to form a $CO_2$ product stream 120, which enters the $CO_2$ purification system 125. The purity of the $CO_2$ product stream 120 produced during regeneration is dependent on the feed $CO_2$ concentration but would typically be higher than 90%. This $CO_2$ product stream 120 can be optionally compressed to pressures, for example, between 1.1 bara and 200 bara prior to purification. The $CO_2$ purification system 125 can be, for example, a distillation system, a membrane system, a pressure or temperature swing adsorption system, or a getter system to remove small amounts of impurities such as nitrogen, oxygen, nitrogen oxides, sulfur oxides, and mercury from the $CO_2$ product stream 120. Also, if the $CO_2$ stream exiting the $CO_2$ separation system 80 has some moisture, the moisture is also removed. A purified $CO_2$ stream 130 exits from the $CO_2$ purification system 125. Stream 135, which is a small part of stream 120, stream 115, or stream 130, may be used to purge the inerts in the $CO_2$ separation system 80. This collective stream 145 enters the $CO_2$ separation system 80. The beds in the $CO_2$ separation system 80 are optionally purged with the $CO_2$ collective stream 145. Stream 150 represents a purge outlet from the beds. Stream 150 is typically a small stream and is vented. The purified $CO_2$ product exits the $CO_2$ purification system 125 as stream 140 and is available, for example, for food or beverage applications, industrial applications, enhanced oil or gas recovery, and sequestration. The purified $CO_2$ product stream 140 may have to be compressed, liquefied or both prior to some of these applications.

In certain embodiments of the moisture removal system as disclosed in the detailed description of FIGS. 4A-4E and FIG. 5, part of the stream produced during the regeneration of the moisture removal system can have very significant enrichment of impurities such as sulfur oxides ($SO_X$) and mercury (Hg). These impurities can be enriched, for example, by a factor of 10 to 50 compared to their levels in the feed stream 70 entering the moisture removal system. The stream enriched in these impurities is represented by stream 69 exemplarily illustrated in FIG. 3. If the plant has an existing system for removal of these impurities, represented by the feed conditioning unit 60, stream 63 is combined with feed to the feed conditioning unit 60 for nearly complete removal of these impurities. If the plant does not have an existing system for removal of impurities such as $SO_X$ and Hg, the feed stream 70 would contain nearly the entire amount of $SO_X$ and Hg produced during combustion. Stream 69 produced during regeneration would contain a significantly higher level of these impurities in a much smaller stream. In this case, stream 69 is sent to a new feed conditioning unit 62 for removal of these impurities. The new feed conditioning unit 62 would be about 2% to about 10% of the size of the existing feed conditioning unit 60 depending on the enrichment levels of $SO_X$ and Hg impurities in the moisture removal system. The purified stream 61 exiting the feed conditioning unit 62 is recycled to the feed of the fan or the blower 65. In this case also, nearly complete removal of $SO_X$ and Hg impurities can be obtained.

FIGS. 4A-4E exemplarily illustrate different configurations of the carbon dioxide ($CO_2$) separation system 80, where moisture is removed in a first separation unit followed by the capture of $CO_2$ by absorption or adsorption in a second separation unit. The adsorption based unit for removal of moisture and other impurities can also be followed by a $CO_2$ separation process not based on temperature swing adsorption. The $CO_2$ separation system 80 comprises an adsorption or chemical reaction system 81 as exemplarily illustrated in FIG. 4A. The adsorption or chemical reaction system 81 contains at least two beds, at least one of which removes $CO_2$ from the feed stream 70, while at least one of which undergoes regeneration at any given time. As disclosed in the detailed description of FIG. 6, additional beds may be used for other steps such as cooling, pressurization, rinse, and evacuation. The rinse step can be performed using a relatively pure $CO_2$ collective stream 145. At least one bed, for example, 81d in the $CO_2$ separation system 80 exemplarily illustrated in FIGS. 4A-4D are optionally purged with the CO2 collective stream 145. Stream 150 represents a purge outlet from the bed 81d. The $CO_2$ product stream exits the $CO_2$ separation system 80 as stream 105 and as an additional optional stream 100.

Figure 4A:
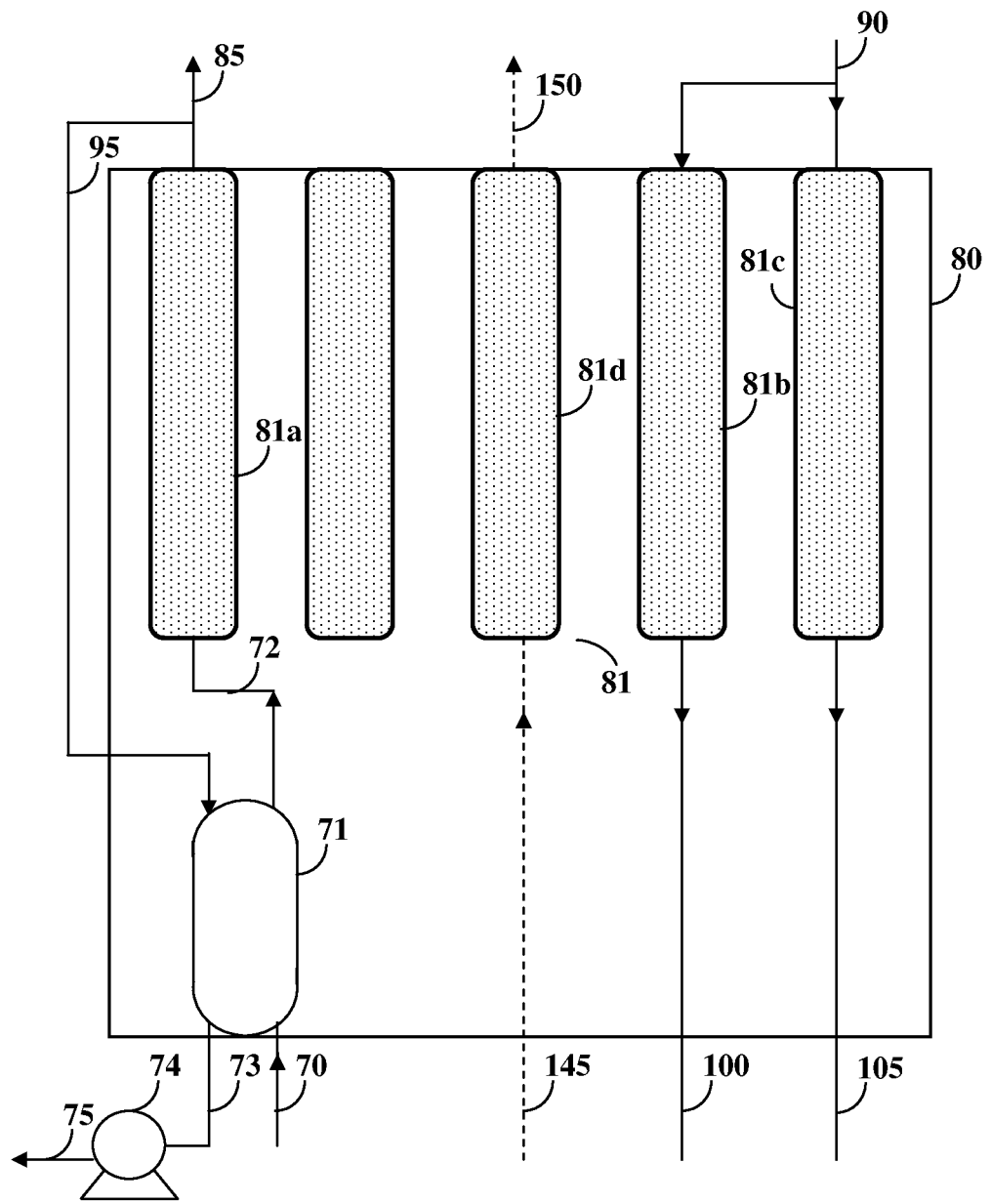
FIGS. 4A-4E exemplarily illustrate different configurations of the carbon dioxide separation system, where moisture is removed in a first separation unit followed by capture of carbon dioxide by absorption or adsorption in a second separation unit.

As exemplarily illustrated in FIG. 4A, a wet $CO_2$ feed stream 70 is passed through a membrane dryer 71, where the moisture from the feed stream 70 is removed. The dry feed stream 72 is sent to adsorption or reaction $CO_2$ capture beds, for example, 81a of the adsorption or chemical reaction system 81, where the $CO_2$ from the dry feed stream 72 is removed and a dry $CO_2$ depleted stream 85 exits the $CO_2$ separation system 80. While $CO_2$ is being adsorbed, at least one other bed, for example, 81b and/or 81c undergoes regeneration using stream 90. Additional beds may be used for other steps such as cooling, pressurization, rinse and evacuation. Part or the entire dry $CO_2$ depleted stream 85 is taken as stream 95 and is used to purge the permeated moisture in the membrane dryer 71. A moisture laden stream 73 exits the membrane dryer 71. An optional vacuum pump 74 may be used to increase the driving force across the membrane and to facilitate moisture removal, and an optional moisture laden stream 75 exits the vacuum pump 74.

Figure 4B:
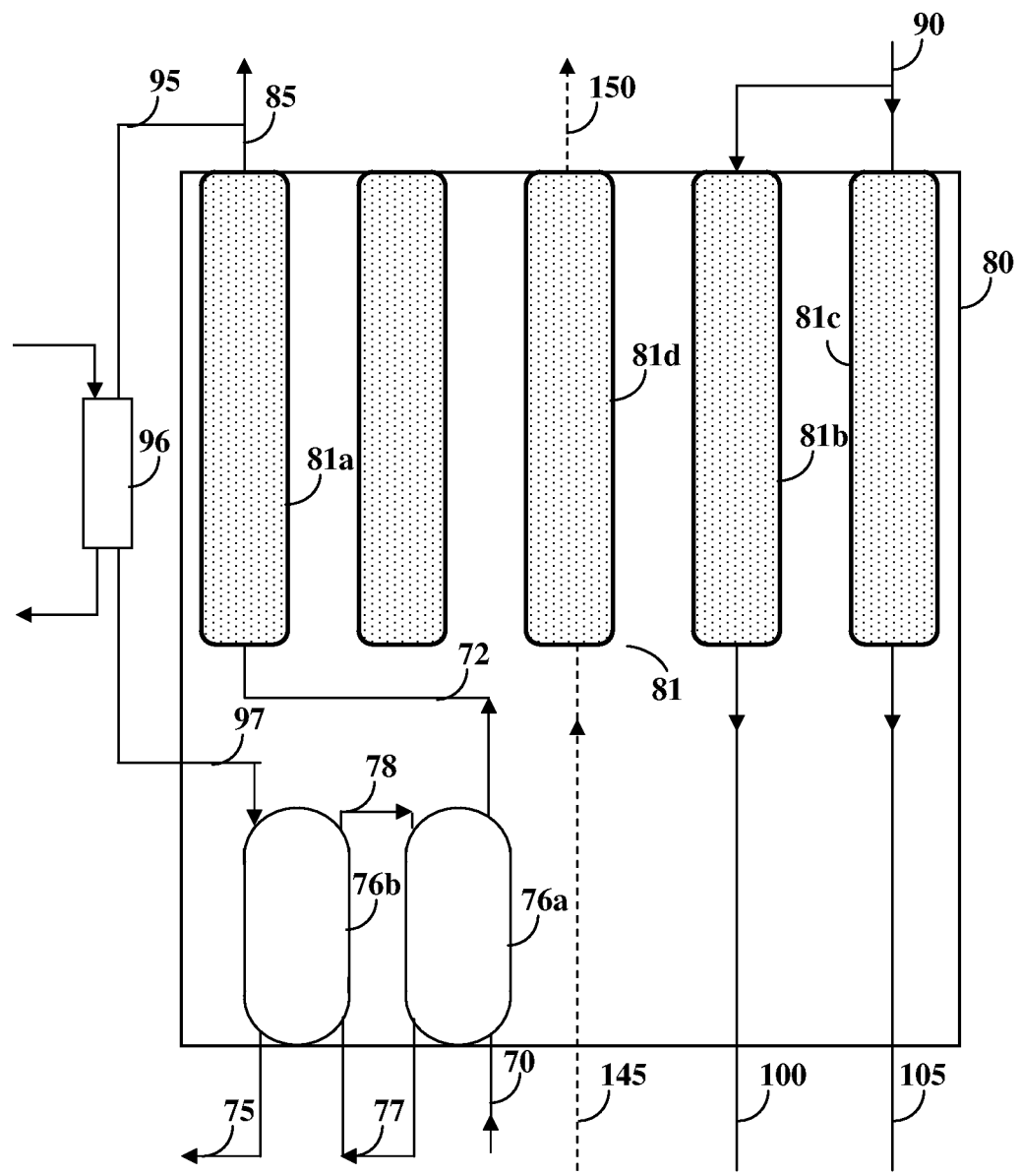

As exemplarily illustrated in FIG. 4B, a wet $CO_2$ feed stream 70 is passed through an absorption system 76a, where the moisture from the feed stream 70 is removed by an absorbent such as ethylene glycol. The beds used for moisture removal would typically contain dumped or structured packing for mass transfer between the feed and the absorbent phases and streams would typically flow in a countercurrent direction. The dry feed stream 72 exiting the absorption system 76a is sent to adsorption or reaction based $CO_2$ capture beds 81a, where the $CO_2$ from the dry feed stream 72 is removed and a dry $CO_2$ depleted stream 85 exits the $CO_2$ separation system 80. While $CO_2$ is being adsorbed, at least one other bed, for example, 81b and/or 81c undergoes regeneration using stream 90. Additional beds may be used for other steps such as cooling, pressurization, rinse, and evacuation. Part or all of the $CO_2$ depleted stream 85 is taken as stream 95, heated in a heat exchanger or a heater 96, and passed through the absorption system 76b as stream 97 to regenerate the moisture loaded solvent stream 77. The solvent loaded with moisture can also be regenerated by countercurrent heat exchange in a heat exchanger (not shown) with steam. The regenerated solvent stream 78 is sent to the absorption system 76a for moisture removal. The stream 95 can be heated by heat exchange with steam or condensate, or the stream 95 may be heated directly using electrical energy. The moisture loaded stream exits the absorption system 76b as stream 75.

Figure 4C:
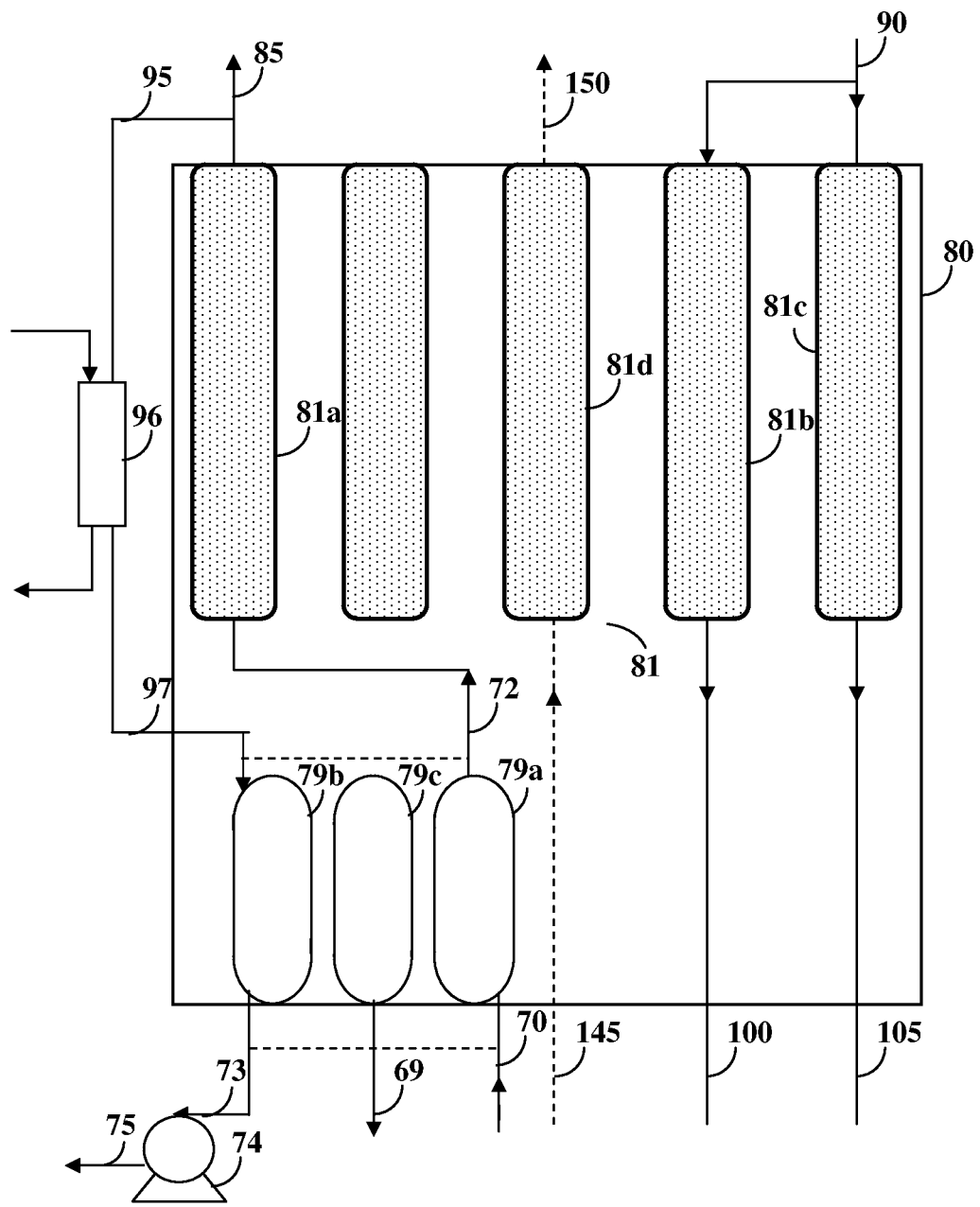

As exemplarily illustrated in FIG. 4C, a wet $CO_2$ feed stream 70 is passed through an adsorption system 79a, where the moisture from the feed stream 70 is removed by an adsorbent such as an activated alumina, a silica gel, or a molecular sieve. The dry feed stream 72 exiting the adsorption system 79a is sent to the adsorption or reaction based $CO_2$ capture beds, for example, 81a, where the $CO_2$ from the dry feed stream 72 is removed and a dry $CO_2$ depleted stream 85 exits the $CO_2$ separation system 80. While $CO_2$ is being removed in one or more $CO_2$ capture beds 81a, at least one other bed, for example, 81b and/or 81c is undergoing regeneration using stream 90. Additional $CO_2$ capture beds may be used for other steps such as cooling, pressurization, rinse, and evacuation. Part or all of the dry $CO_2$ depleted stream 85 is taken as stream 95, optionally heated in a heat exchanger or a heater 96, and is used to regenerate the moisture removal beds in the adsorption system 79b. If stream 95 is heated prior to regeneration of the moisture removal beds in the adsorption system 79b, the stream 95 can be heated by heat exchange with steam or hot water. The stream 95 can also be heated directly using electrical energy. The moisture loaded stream 73 exits the adsorption system 79b and a sulfur oxide ($SO_X$) and mercury (Hg) enriched stream 69 exits the adsorption system 79c. The $SO_X$ and Hg enriched stream 69 can be recycled to an existing feed conditioning unit 60 as exemplarily illustrated in FIG. 3, for removal of the impurities or to a new feed conditioning unit 62 as exemplarily illustrated in FIG. 3, for removal of $SO_X$ and Hg impurities. An optional vacuum pump 74 can be used to provide additional driving force for the moisture removal and a water loaded stream 75 then exits the vacuum pump 74.

Figure 4D:
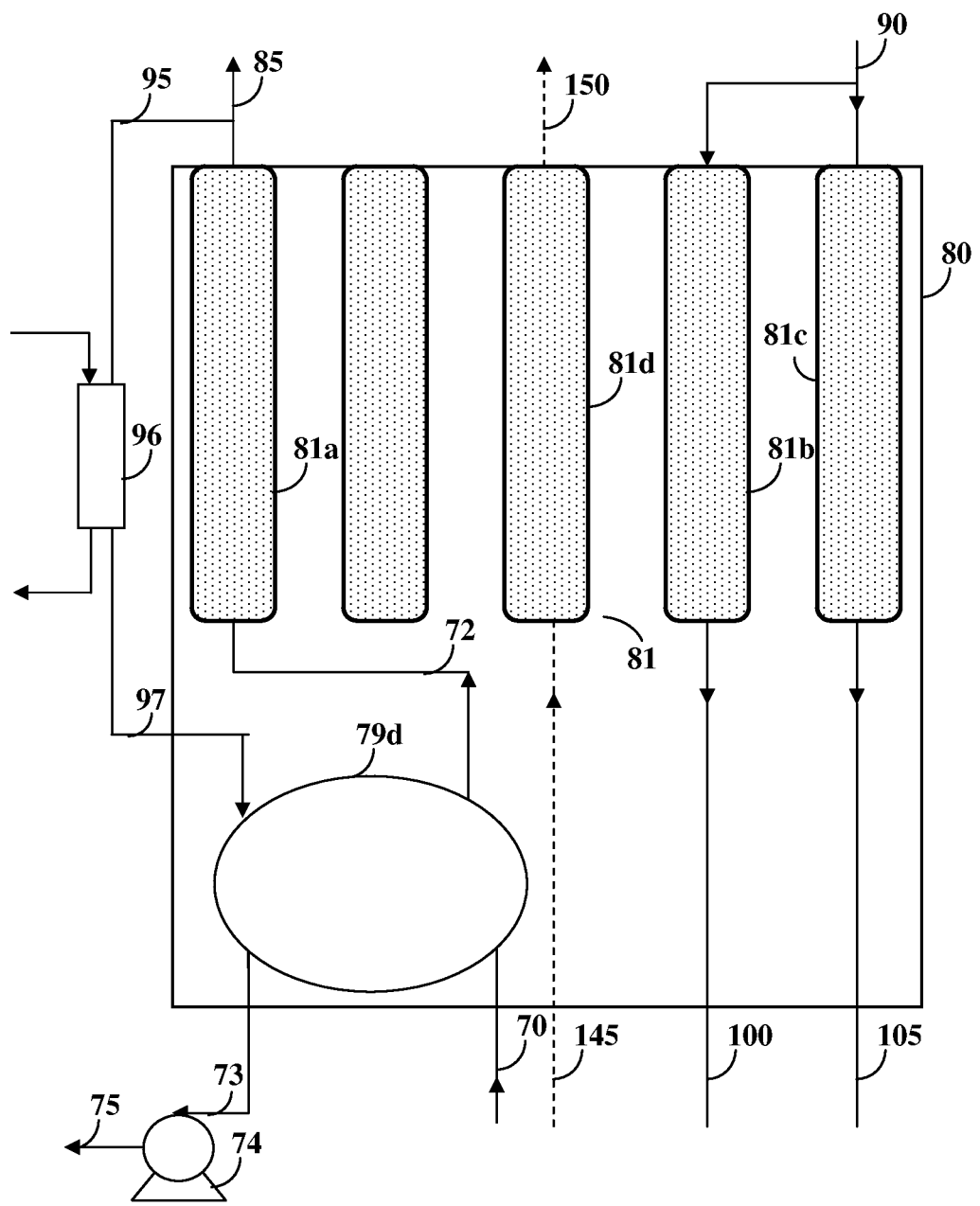

As exemplarily illustrated in FIG. 4D, a wet $CO_2$ feed stream 70 is passed through a rotating bed adsorption system 79d, where the moisture from the feed stream 70 is removed by an adsorbent such as an activated alumina, a silica gel, or a molecular sieve. A relatively dry feed stream 72 exiting the adsorption system 79d is sent to the adsorption or reaction based $CO_2$ capture beds, for example, 81a, where the $CO_2$ from the dry feed stream 72 is removed and a dry $CO_2$ depleted stream 85 exits the $CO_2$ separation system 80. While $CO_2$ is being removed in one or more $CO_2$ capture beds 81a, at least one other bed, for example, 81b and/or 81c is undergoing regeneration using stream 90. Additional $CO_2$ capture beds may be used for other steps such as cooling, pressurization, rinse, and evacuation. Part or all of the dry $CO_2$ depleted stream 85 is taken as stream 95, heated in a heat exchanger or a heater 96 by heat exchange with steam or hot water, and stream 97 is used to regenerate a rotating bed for moisture removal in the adsorption system 79d. The stream 95 can also be heated directly using electrical energy. A moisture loaded stream 73 exits the adsorption system 79d and contains other impurities such as sulfur oxide ($SO_X$) and mercury (Hg). An optional vacuum pump 74 can be used to provide additional driving force for the moisture removal and a water loaded stream 75 then exits the vacuum pump 74. Typical rotation time for the rotating bed adsorption system 79d is, for example, about 4 minutes to about 20 minutes and regeneration temperatures, for example, between about 100° C. to about 250° C. can be used for removal of moisture and other impurities.

Figure 4E:
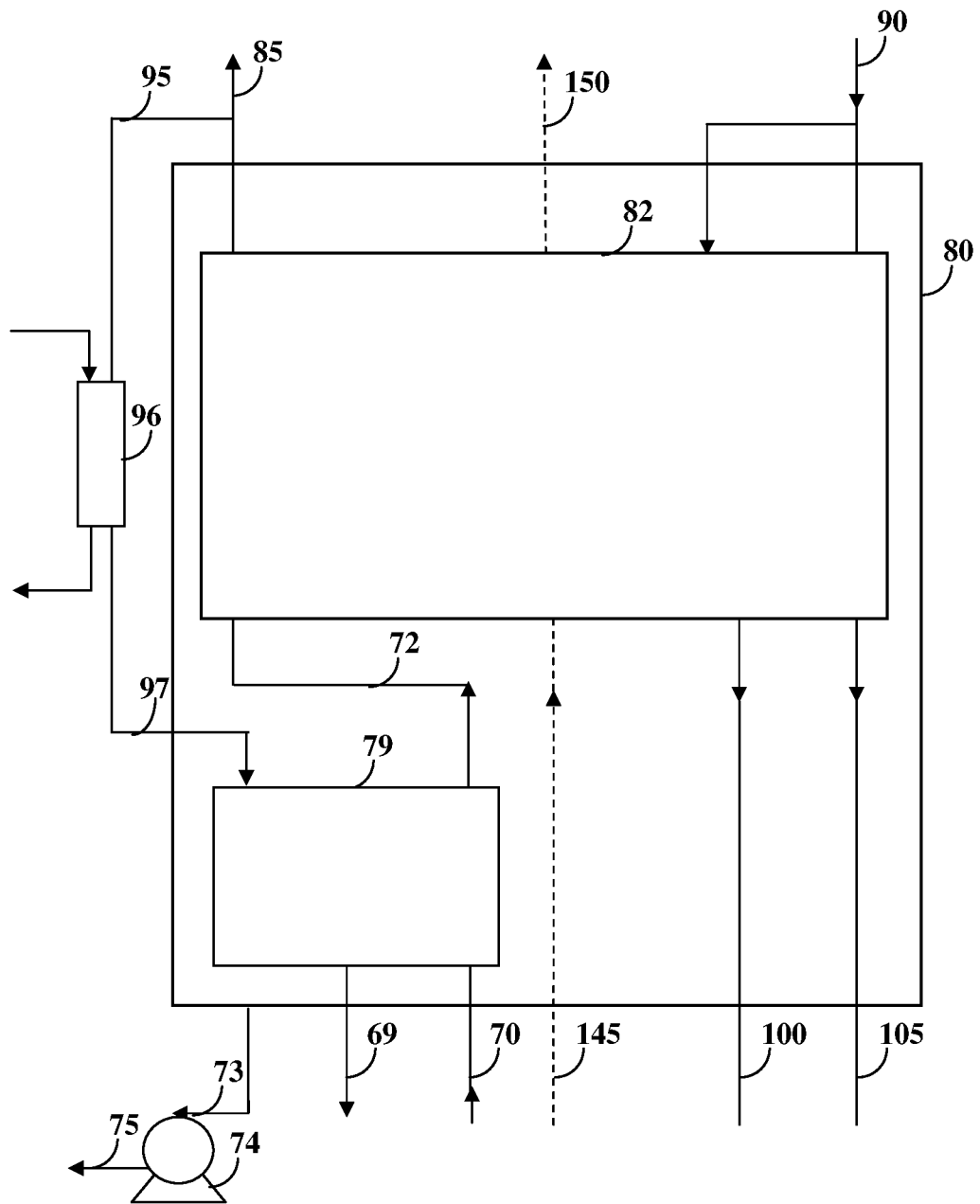

As exemplarily illustrated in FIG. 4E, a wet $CO_2$ feed stream 70 is passed through a moisture removal system 79, where the moisture from the feed stream 70 is removed by an adsorbent such as an activated alumina, a silica gel, or a molecular sieve. In addition to moisture, other impurities such as sulfur oxides ($SO_X$) and mercury (Hg) are also removed in this moisture removal system 79. The moisture removal system 79 can be multi-bed adsorption system comprising beds 79a, 79b, 79c, etc., as exemplarily illustrated in FIG. 4C, or the rotating bed adsorption system 79d as exemplarily illustrated in FIG. 4D. A relatively dry feed stream 72 exiting the moisture removal system 79 is sent to a system 82. The system 82 can be an absorption system based on a solvent other than an aqueous amine such as an organic solvent. At least two vessels are used for the absorption based processes with one bed undergoing absorption and another bed undergoing thermal regeneration. If a solvent with low vapor pressure is used, the $CO_2$ product can be at pressures, for example, between about 1.1 bara and about 10 bara, if indirect heat exchange is performed at temperatures, for example, between about 100° C. and about 250° C. This can reduce the $CO_2$ compression costs.

The $CO_2$ capture beds, for example, 81a as exemplarily illustrated in FIGS. 4A-4D can also be implemented via a pressure or vacuum swing adsorption system in addition to temperature swing adsorption. If vacuum swing adsorption is used for $CO_2$ capture, regeneration pressure used would typically be, for example, between about 0.01 bara to about 0.1 bara, and an adsorbent such as 13X or 5A zeolite would be used. At least two beds are needed for pressure or vacuum swing adsorption with one bed undergoing adsorption and another bed undergoing regeneration. Additional beds can be used for steps such as pressurization, equalization, and rinse. In both cases, a $CO_2$ depleted stream 85 exits the $CO_2$ separation system 80. Part or the entire $CO_2$ depleted stream 85 is taken as stream 95, heated in a heat exchanger or a heater 96, and then passed as stream 97 to an adsorption based moisture removal system 79. The moisture loaded stream 73 exits the adsorption based moisture removal system 79 and contains other impurities such as sulfur oxide ($SO_X$) and mercury (Hg). An optional vacuum pump 74 can be used to provide an additional driving force for the moisture removal. A water loaded stream 75 then exits the vacuum pump 74. If the multi-bed adsorption system comprising beds 79a, 79b, 79c, etc., as exemplarily illustrated in FIG. 4C is used, $SO_X$ and Hg enriched stream 69 is produced, which is sent to an existing feed conditioning unit 60 or to a new feed conditioning unit 62 as exemplarily illustrated in FIG. 3, for removal of these impurities. Relatively pure $CO_2$ product streams 100 and 105 exit the $CO_2$ separation system 80 and are produced during the regeneration of solvent or the adsorbent. These $CO_2$ product streams 100 and 105 may be further purified in a downstream adsorption or chemical reaction system 125 as exemplarily illustrated in FIG. 3.

The moisture removal system 79 as exemplarily illustrated in FIG. 4C or as exemplarily illustrated in FIG. 4E, would typically contain multiple adsorption beds, for example, 79a, 79b, 79c, etc., for removal of moisture as well as other impurities such as heavy hydrocarbons that can hinder the adsorption of $CO_2$ in the $CO_2$ capture beds 81a as exemplarily illustrated in FIGS. 4A-4D. Moisture removal beds positioned in the moisture removal system 79 can also be configured to remove some of the sulfur oxides, and mercury impurities in the feed. For moisture removal, the moisture removal beds in the moisture removal system 79 would typically be operated in a pressure swing, temperature swing, or a vacuum swing mode. For pressure or vacuum swing adsorption, the heat of water adsorption would be retained during adsorption and stream 95 at reduced pressure would desorb the moisture. While it is possible to remove moisture by pressure swing adsorption alone, it may be necessary to use temperature swing adsorption for desorption of other impurities such as the heavy hydrocarbons, sulfur oxides, and mercury. This can be performed in a cycle of three or more beds as disclosed in the detailed description of FIG. 5.

Figure 5:
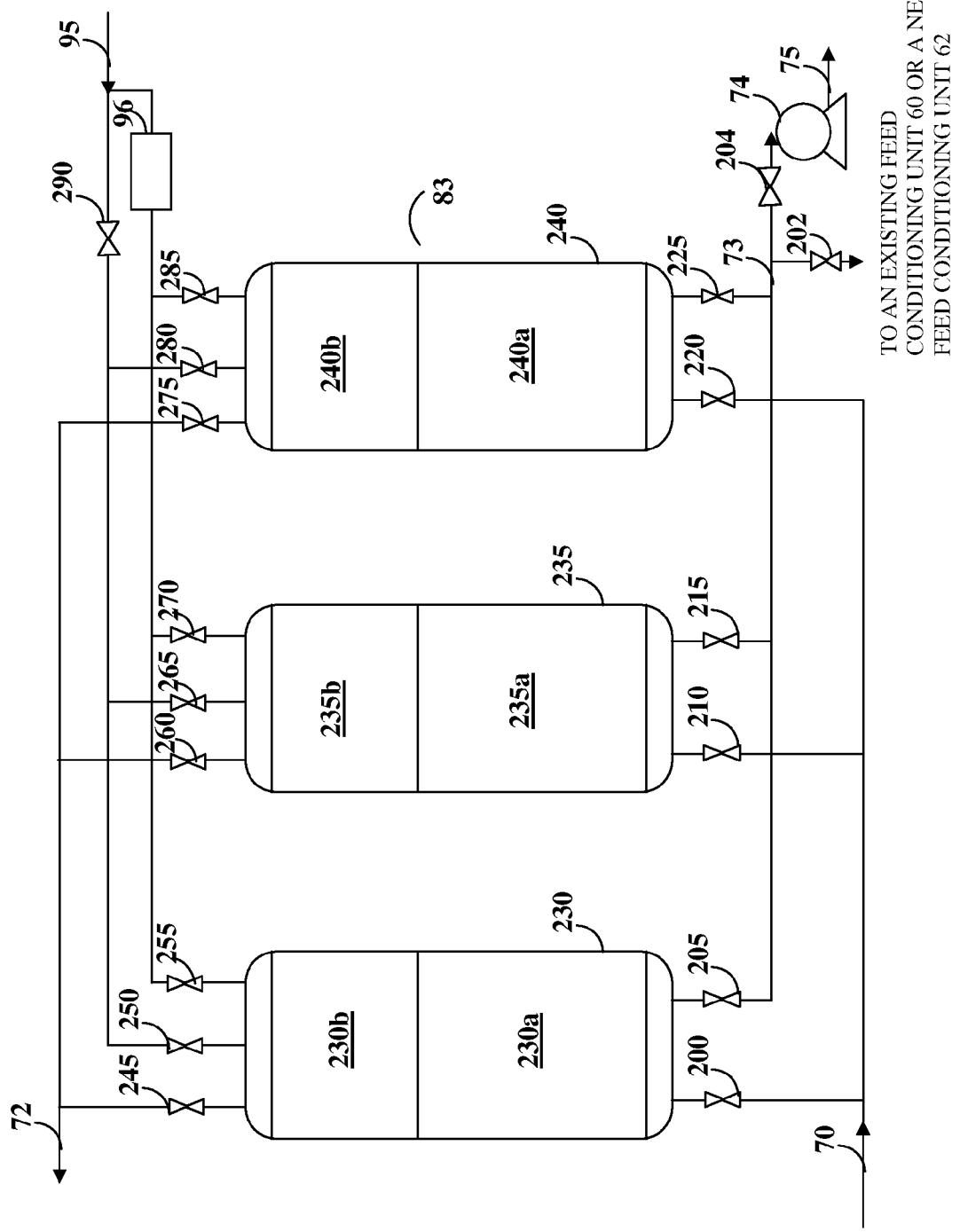
FIG. 5 exemplarily illustrates a configuration of a moisture removal system, where moisture and impurities such as hydrocarbons, sulfur oxides, and mercury are removed by a combination of pressure, temperature and vacuum swing adsorption.

FIG. 5 illustrates a configuration of a moisture removal system 83, where the moisture and impurities such as hydrocarbons, sulfur oxides, and mercury are removed by a combination of pressure, temperature and vacuum swing adsorption. In an embodiment as exemplarily illustrated in FIG. 5, the moisture removal system 83 is configured as a three bed pressure and temperature swing adsorption system. Although a three bed pressure and temperature swing adsorption system for removal of moisture and other impurities is disclosed herein and exemplarily illustrated in FIG. 5, the moisture and trace impurities removal process is not limited to a three bed system. If removal of impurities such as sulfur oxides and hydrocarbons is not needed, two beds operating in a pressure swing adsorption (PSA) mode, a vacuum swing adsorption (VSA) mode, or a temperature swing adsorption (TSA) mode can be used. Also, when the moisture removal system 83 operates in the PSA mode and the TSA mode, or the VSA mode and the TSA mode, more than two beds can be used for PSA or VSA operation and more than one bed can be used for the TSA operation. Also, all three beds can be operated in the TSA mode for removal of moisture and other impurities. The number of adsorption beds in the moisture removal system 83 is not critical to the operation of this process. As exemplarily illustrated in FIG. 5, the wet feed stream 70 enters the moisture removal system 83 through valves 200, 210, and 220. These valves 200, 210, and 220 control flow of feed gas into vessels 230, 235, and 240. The vessels 230, 235, and 240 each have first adsorbent layers 230a, 235a, and 240a, which comprise adsorbents such as an activated alumina, a silica gel, or a molecular sieve such as a 3A, 4A, 5A and 13X zeolite for moisture removal. Positioned in the vessels 230, 235, and 240 above the layers 230a, 235a, and 240a are optional layers 230b, 235b, and 240b, respectively, which comprise one or more adsorbents selective for hydrocarbons, sulfur oxides, and mercury. Adsorbents such as the activated carbon, zeolites such as 13X, 5A, AW-300, and AW-500, and impregnated aluminas can be used for adsorbing these impurities.

Modified or unmodified activated carbons and silicates can be used for removal of mercury impurities. The adsorbents in the vessels 230, 235, and 240 are selected to minimize the adsorption of carbon dioxide ($CO_2$) so as to maximize the recovery of $CO_2$ in the $CO_2$ capture beds, for example, 81*a* exemplarily illustrated in FIG. 4D. The adsorbents for moisture removal are, for example, 3A and 4A zeolites, activated alumina, a silica gel, and mixtures of activated alumina and zeolites 3A and 4A.

The outlet ends of the vessels 230, 235, and 240 are connected to discharge lines with valves 245, 260, and 275 respectively. When a bed is undergoing adsorption, the dry $CO_2$ containing stream 72 exits the moisture removal system 83 through one of these valves 245, 260, and 275, and is sent to the $CO_2$ separation system 80 exemplarily illustrated in FIG. 3. The purge gas 95 from the $CO_2$ separation system 80 is used to regenerate the moisture removal beds. For the pressure swing adsorption (PSA) or the vacuum swing adsorption (VSA) mode of regeneration, the purge gas 95 enters through valve 290 and then one of the valves 250, 265, and 280 and exits the moisture removal system 83 via corresponding valves 205, 215, and 225 as stream 73. If an optional vacuum pump 74 is used, then the purge gas 95 exits the moisture removal system 83 as stream 75. For the temperature swing adsorption (TSA) mode of regeneration, the purge gas 95 is heated in the heat exchanger or the heater 96 and enters the vessels 230, 235, and 240 through one of the open valves 255, 270, and 285 and exits the moisture removal system 83 via corresponding valves 205, 215, and 225. If the vacuum pump 74 is not used, the purge gas 95 exits the moisture removal system 83 as stream 73. During the TSA mode of regeneration, the regeneration gas exiting the moisture removal system 83 would be significantly enriched in impurities such as sulfur oxide ($SO_X$) and mercury (Hg) during at least part of the regeneration cycle. This regeneration gas is recycled to an existing feed conditioning unit 60 or to the new feed conditioning unit 62 exemplarily illustrated in FIG. 3, for removal of these impurities, by opening valve 202 and closing valve 204. If the vacuum pump 74 is used, the purge gas 95 exits the moisture removal system 83 as stream 75. In normal operation, regeneration of one of the vessels 230, 235, and 240 by PSA or VSA and another vessel 230, 235, or 240 by TSA is contemplated.

In an embodiment, the various layers 230*a* and 230*b*, 235*a* and 235*b*, and 240*a* and 240*b* are contained in single vessels 230, 235, and 240 respectively as exemplarily illustrated in FIG. 5, although each layer 230*a*, 230*b*, 235*a*, 235*b*, 240*a*, and 240*b* may be contained in separate vessels, if desired. The duration of each complete cycle of the pressure swing adsorption (PSA) stage is, for example, about 4 minutes to about 60 minutes, while the duration of the thermal regeneration is generally about 1 hour to about 12 hours; accordingly, during any single phase of the process, the two vessels in the PSA mode or the vacuum swing adsorption (VSA) mode will undergo many PSA or VSA cycles while the third vessel undergoes a single thermal regeneration step. For purposes of illustration, it will be assumed that the PSA or VSA process is carried out with pressurization to super atmospheric pressure during the adsorption step and reduction of pressure to atmospheric pressure or below during the bed regeneration step. The pressure in the vessel undergoing thermal regeneration is at or near atmospheric pressure.

The process described below comprises three phases: a first phase, in which the vessels 230 and 235 are initially operating in an alternating pressure swing adsorption (PSA) or vacuum swing adsorption (VSA) cycle and the adsorbent in the vessel 240 is undergoing thermal regeneration; a second phase, in which the vessels 235 and 240 are operating in an alternating PSA or VSA cycle, while the adsorbent in the vessel 230 undergoes thermal regeneration; and a third phase, in which the vessels 230 and 240 are operating in an alternating PSA or VSA cycle, while the adsorbent in the vessel 235 undergoes thermal regeneration.

At the start of stage 1 of the first phase of the process, one of the vessels 230 or 235, for example, the vessel 230 is in the adsorption mode and the other vessel, for example, 240 is in the regeneration mode. With the vessel 230 starting in the adsorption mode, a wet feed stream 70 enters the bed through open valve 200 and exits the bed through the open valve 245. Prior to the start of adsorption, the vessel 230 is pressurized to the adsorption pressure through the valve 200. As the wet feed stream 70 passes through the vessel 230, substantially all the moisture, hydrocarbons, sulfur oxides, and mercury are removed. The dew point of the gas stream exiting the moisture removal system 83 would typically be, for example, below about −40° C. or below about −80° C. For regeneration of the bed 235, part of the purge gas 95 enters through the open valves 290 and 265, picks up moisture from the adsorbent bed 235, and exits through the valve 215. In an embodiment, the purge gas 95 is heated prior to using the purge gas 95 in the pressure swing adsorption (PSA) process or the vacuum swing adsorption (VSA) process. The remainder of the purge gas 95 entering the moisture removal system 83 is heated in the heat exchanger or the heater 96 and then flows through the layers 240*a* and 240*b* in the vessel 240. As the heated purge gas 95 passes through the layers 240*a* and 240*b* in the vessel 240, the heated purge gas 95 desorbs the residual moisture, hydrocarbons, sulfur oxides, and mercury from different layers that have gradually built up in this vessel 240 over the previous PSA or VSA stages carried out in this vessel 240. The regeneration gas, together with the desorbed impurities, leaves the vessel 240 through the open valves 225 and 202 or through the open valves 225 and 204. After a certain time based on the moisture concentration in stream 72 and the retention of the heat front in the bed, typically about 4 minutes to about 60 minutes, the vessel 230 starts undergoing regeneration while the vessel 235 starts removing moisture and other impurities. The vessels 230 and 235 continue under PSA or VSA operation for a period of several hours or days, for example, about 8 hours to about 96 hours, while the vessel 240 is thermally regenerated during part of this time. The temperatures for thermal regeneration typically range between, for example, about 100° C. and about 300° C., but can be higher or lower depending on the material. The impurities such as mercury and sulfur oxides removed during the thermal regeneration may be sent to the existing mercury and sulfur removal feed conditioning unit 60 or to a new feed conditioning unit 62 as exemplarily illustrated in FIG. 3 for further reduction of these impurities.

As the pressure swing adsorption (PSA) or vacuum swing adsorption (VSA) cycle proceeds in the vessels 230 and 235, various impurities such as sulfur oxides and mercury accumulate in these vessels 230 and 235. Accumulation of these various impurities occurs as these impurities are not removed during the purge step of the PSA or the VSA. When the buildup of these components in one or more layers reaches the point where the efficiency of the gas purification process is threatened, the first phase of the process is terminated and the second phase is started.

During the second phase of the process, the vessels 235 and 240 are in alternating pressure swing adsorption (PSA) or vacuum swing adsorption (VSA) service and the adsorbents in the vessel 230 undergo thermal regeneration. At the start of stage 1 of this phase of the process, one of the vessels 235 or 240, for example, vessel 235 is in the adsorption mode and the other vessel, for example, 230 is in the regeneration mode. With the vessel 235 starting in the adsorption mode, the wet feed stream 70 enters the bed through the open valve 210 and exits the bed through the open valve 260 and is purified in the process. Prior to the start of adsorption, the vessel 235 is pressurized to the adsorption pressure through the valve 210. For regeneration of the bed 240, part of the purge gas 95 enters through the open valves 290 and 280, picks up moisture from the adsorbent bed 240, and exits through the open valve 225. The remainder of the purge gas 95 entering the moisture removal system 83 is heated in the heat exchanger or the heater 96 and then flows through the layers 230a and 230b in the vessel 230 and desorbs the residual moisture, hydrocarbons, sulfur oxides, and mercury from different layers that have gradually built up in this vessel 230 over the previous PSA or VSA stages carried out in this vessel 230. The regeneration gas, together with the desorbed impurities, leaves the vessel 230 through the open valves 205 and 202 or through the open valves 205 and 204. After a certain time based on moisture concentration in stream 72 and retention of the heat front in the vessel 235, the vessel 235 starts undergoing regeneration while the vessel 240 starts removing moisture and other impurities. The vessels 235 and 240 continue under alternating PSA or VSA operation for a period of several hours or days while the vessel 230 is thermally regenerated during part of this time.

As the pressure swing adsorption (PSA) or vacuum swing adsorption (VSA) cycle proceeds in the vessels 235 and 240, various impurities buildup in the vessels 230, 235, and 240. When the buildup of these components in one or more layers reaches the point where the efficiency of the gas purification process is threatened, the second phase of the process is terminated and the third phase is started. During the third phase of the process, the vessels 230 and 240 are in pressure swing adsorption (PSA) or vacuum swing adsorption (VSA) service and the adsorbent in the vessel 235 undergoes thermal regeneration. Operation of the third phase is similar to the operation of the first phase and the second phase. After all the three phases are completed, the process starts again with phase one, with all three phases repeated in a cyclic manner.

Figure 6:
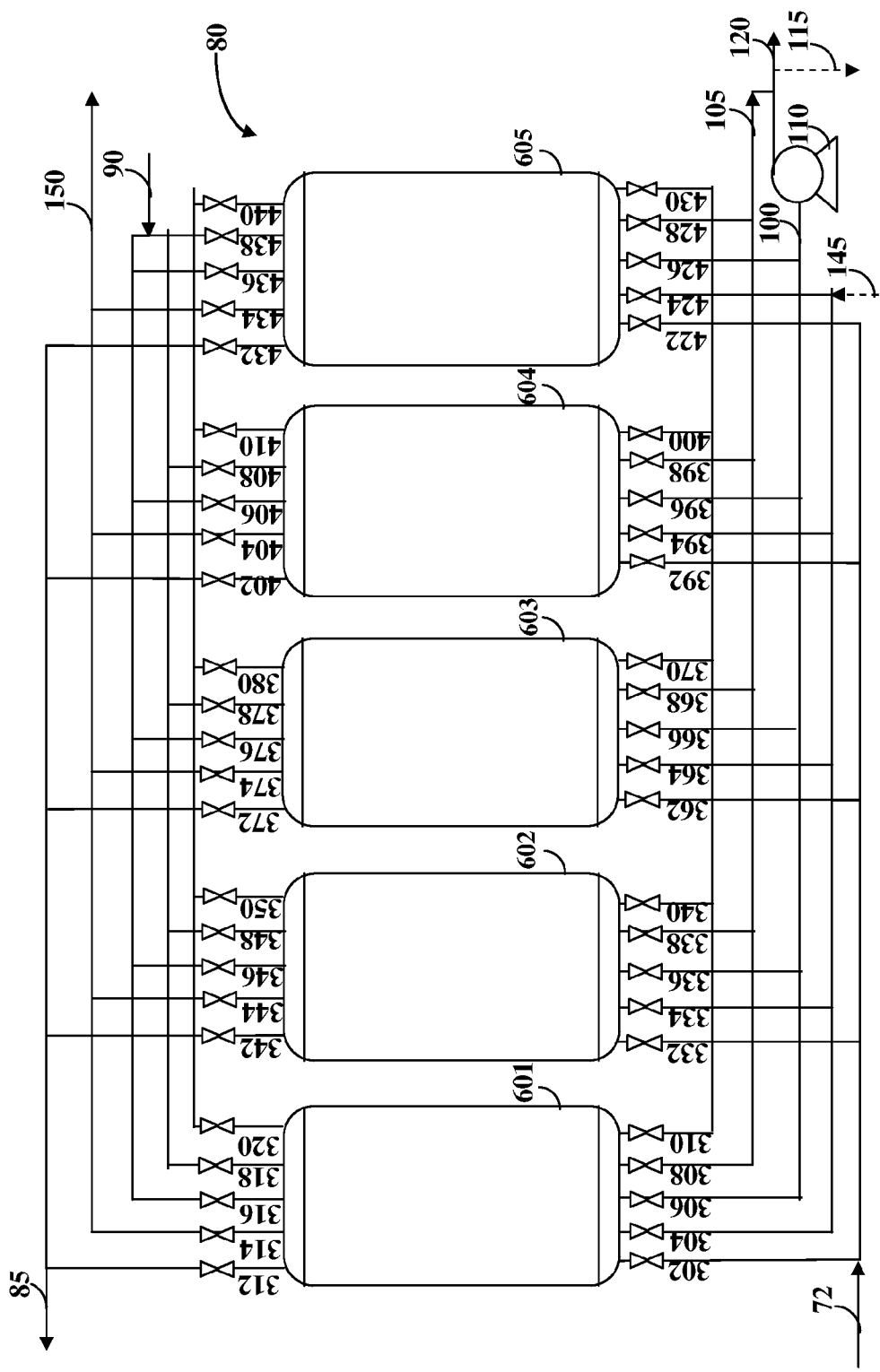
FIG. 6 exemplarily illustrates a configuration of the carbon dioxide separation system, where carbon dioxide is removed from a feed stream by adsorption or a chemical reaction and is recovered by heating indirectly using steam, hot water, or a dry stream recovered from the carbon dioxide separation system.

Similar to the PSA or vacuum swing adsorption (VSA) beds, the $CO_2$ adsorbent or reaction beds, for example, beds 601, 602, 603, 604, and 605 exemplarily illustrated in FIG. 6, also undergo a cyclic process to provide continuous operation and also to maximize $CO_2$ recovery. These beds 601, 602, 603, 604, and 605 contain one or more materials that have a significant selectivity for $CO_2$ over other major components of the flue gas, namely, oxygen, nitrogen, and argon. Some of the materials that can be used to capture $CO_2$ from the flue gas comprise, for example, activated carbon, carbon molecular sieves, zeolites such as 4A, 5A, 13X, NaY, and CaX, metal-lorganic framework compounds, natural zeolites, modified natural and synthetic zeolites, modified activated carbon, pillared clays, and reactive sorbents such as sodium and potassium carbonates, amines or ionic liquids supported on a microporous support, etc.

Various beds in the $CO_2$ separation system 80 exemplarily illustrated in FIG. 3 typically undergo the steps of adsorption, equalization, rinse with the $CO_2$ product, heating, heating with evacuation, cooling, and re-pressurization. Depending on the material and the process conditions, different combinations of the steps can be used to maximize the $CO_2$ recovery. Also, in some of the cycles, some of the steps such as bed cooling can be eliminated. During the operation of the $CO_2$ capture beds 81a exemplarily illustrated in FIG. 4A, any sulfur oxide impurities in the feed to the $CO_2$ separation system 80 are likely to be removed as most adsorbents have a higher affinity for sulfur oxides than $CO_2$. Since most adsorbents have a higher affinity for $CO_2$ than nitrogen oxides, most of the nitrogen oxide impurities in the feed to this $CO_2$ separation system 80 would pass through into the $CO_2$ depleted stream 85 exemplarily illustrated in FIG. 3, leaving the $CO_2$ separation system 80. For $CO_2$ removal by a chemical reaction such as with supported carbonates or amines, some of the nitrogen and sulfur oxides may also be removed by the chemical reaction.

FIG. 6 exemplarily illustrates a configuration of the carbon dioxide ($CO_2$) separation system 80, where $CO_2$ is removed from a feed stream by adsorption or a chemical reaction and is recovered by heating indirectly using steam, hot water, or a dry stream recovered from the $CO_2$ separation system 80. The $CO_2$ feed step and the $CO_2$ production steps are continuous in this cycle. While the $CO_2$ capture is illustrated using a five bed method, the $CO_2$ capture method disclosed herein is not limited to five beds. The method disclosed herein can use less than five beds or more than five beds though a minimum of two beds are required to carry out $CO_2$ capture and production at the same time. As exemplarily illustrated in FIG. 6, at any given time, one bed is removing $CO_2$ from the feed using adsorption or a chemical reaction, another bed is undergoing equalization and pressurization steps, a third bed is producing $CO_2$ while being heated, a fourth bed is producing $CO_2$ during heating and evacuation steps, and a fifth bed is undergoing the steps of $CO_2$ rinse and equalization. Other cycles similar to this can be used omitting the steps such as the $CO_2$ rinse and adding steps such as bed cooling after the heating steps. The equalization can be performed from the bottom, from the top, or from both the top and the bottom. Pressurization can also be performed from the bottom using the feed or from the top using the $CO_2$ depleted stream 85. Each individual step of the $CO_2$ capture method takes, for example, about 2 minutes to about 60 minutes to maximize the productivity of the method. A typical cycle using the five bed configuration as exemplarily illustrated in FIG. 6 is given in Table I below.

The feed to the beds or adsorbers 601, 602, 603, 604, and 605 is typically maintained at a temperature, for example, between about 10° C. and about 80° C., and at pressures, for example, between about 1.07 bara and 40 bara. For the $CO_2$ capture from the flue gas of a power plant or a refinery, the pressures are, for example, about 1.07 bara and 1.34 bara. The regeneration temperatures are, for example, about 80° C. to about 300° C. and more typically from about 80° C. to about 150° C. The concentration of $CO_2$ in the feed gas is, for example, about 3% for a natural gas fired power plant, about 12% for a coal fired power plant, and up to 60% of $CO_2$ for various chemical processes. Prior to the initial start of $CO_2$ separation, the beds 601, 602, 603, 604, and 605 may be heated to temperatures, for example, higher than 300° C. to remove any residual moisture contained therein. High temperature regeneration may also be performed to remove impurities built up during normal operation.

The operation of various valves is exemplarily illustrated using steps 1 and 2 of Table I below. In both steps 1 and 2 for bed 601, feed gas 72 enters the bed 601 through an open valve 302, $CO_2$ is captured in the bed 601, and the $CO_2$ depleted stream 85 exits through the open valve 312. During step 1, the beds 602 and 605 undergo pressure equalization through open valves 340 and 430. During step 2, the bed 602 is pressurized using the bed 601 through open valves 320 and 350. During both steps 1 and 2, the bed 603 is regenerated by heating under vacuum and valve 366 is open. The high purity $CO_2$ product leaves as stream 100 prior to entering the vacuum pump 110. During both steps 1 and 2, the bed 604 is regenerated by heating, valves 398 and 408 are open, and the $CO_2$ product leaves as stream 105. During step 2, bed 605 is rinsed with the $CO_2$ product stream 145 which enters the bed 605 through open valve 424 and exits through open valve 434. Operation of various valves during steps 3 to 10 is similar to operation during steps 1 and 2. Once all the steps are completed, the cycle is repeated continuously starting at step 1.

The adsorbent beds exemplarily illustrated in FIGS. 4A-4D, FIG. 5, and FIG. 6 may contain particulate adsorbents as well as structured adsorbents. The particulate adsorbents are available, for example, in the form of beads, pellets, or extrudates from various vendors such as UOP LLC and Ceca. The structured adsorbents are available from companies such as Munters Corporation and NovelAire Technologies. These

TABLE I

Typical Cycle Sequence for the $CO_2$ Capture Method

| Step | Bed 601 | Bed 602 | Bed 603 | Bed 604 | Bed 605 | Time, mins |
|---|---|---|---|---|---|---|
| 1 | Adsorption/reaction | Equalization with Bed 605 | Heating with evacuation | Heating | Equalization with Bed 602 | 2.0 |
| 2 | Adsorption/reaction | Pressurization | Heating with evacuation | Heating | $CO_2$ rinse | 2.0 |
| 3 | Equalization with Bed 603 | Adsorption/reaction | Equalization with Bed 601 | Heating with evacuation | Heating | 2.0 |
| 4 | $CO_2$ rinse | Adsorption/reaction | Pressurization | Heating with evacuation | Heating | 2.0 |
| 5 | Heating | Equalization with Bed 604 | Adsorption/reaction | Equalization with Bed 602 | Heating with evacuation | 2.0 |
| 6 | Heating | $CO_2$ rinse | Adsorption/reaction | Pressurization | Heating with evacuation | 2.0 |
| 7 | Heating with evacuation | Heating | Equalization with Bed 605 | Adsorption/reaction | Equalization with Bed 603 | 2.0 |
| 8 | Heating with evacuation | Heating | $CO_2$ rinse | Adsorption/reaction | Pressurization | 2.0 |
| 9 | Equalization with Bed 604 | Heating with evacuation | Heating | Equalization with Bed 601 | Adsorption/reaction | 2.0 |
| 10 | Pressurization | Heating with evacuation | Heating | $CO_2$ rinse | Adsorption/reaction | 2.0 |

Total 20.0 minutes

As exemplarily illustrated in Table I, various steps in the $CO_2$ capture and regeneration process are significantly faster than in a typical temperature swing adsorption process where these steps are of the order of hours. For adsorbents or reactants that are not moisture tolerant such as zeolites, the beds 601, 602, 603, 604, and 605 may have to be heated indirectly. One such configuration is a shell and tube configuration, where the adsorbents or reactants are contained in small diameter tubes and the heating medium flows on the shell side during the regeneration part of the cycle. Regeneration temperatures of, for example, about 80° C. to about 300° C. can be obtained using steam or hot water as the heating medium. A heated liquid or vapor stream utilizing the electricity generated in a power plant can also be used for regeneration. An alternative configuration includes the adsorbent material on the shell side and the heating or the cooling fluid on the tube side. Another configuration that allows indirect heating is a plate and frame configuration, where adsorbents are contained in alternate parallel passages and the heated fluid flows in alternate parallel passages. Steam or a heated fluid may be used as the heating medium. For the shell and tube configuration and the plate and frame configuration, cold fluid can be used during the $CO_2$ removal step to remove the heat of adsorption or chemical reaction. Cold fluid can also be used for the bed cooling steps. For retrofit applications, it may be easier to use the hot water or low pressure steam as the regeneration medium as this minimizes the disruption to the steam cycle of the power plant and would be easy to retrofit. In addition to the vertical beds, both the horizontal beds and the radial beds can be used for carrying out the cycle. Also, if needed, either the shell and tube configuration or the plate and frame configuration can be used for heat exchange with the horizontal beds or the radial beds.

structured adsorbents are made by mixing an adsorbent, for example, zeolites, a silica gel, etc., a fiber such as a polyaramid, and a binder to form a slurry. The slurry is processed in a conventional papermaking machine to make very thin (<0.25 mm) corrugated and flat sheets. The corrugated and flat sheets are laminated together and wrapped around a central core to make monoliths in the shape of a wheel. The performance of these structured adsorbents can be improved significantly by high temperature activation. Furthermore, monoliths made from zeolites and a binder can also be used and are available from companies such as Munters Corporation. Another form of structured adsorbents including adsorbents coated on metal or ceramic monoliths can also be used.

The $CO_2$ generated during the regeneration of a $CO_2$ containing material would typically have a purity of, for example, higher than 90%. This $CO_2$ stream is compressed and sent to a $CO_2$ purification plant. If a membrane is used for $CO_2$ purification, a small portion of the $CO_2$ stream is allowed to permeate the membrane to produce a higher purity $CO_2$ stream, which is used as a rinse stream in the $CO_2$ separation system 80. The remaining $CO_2$ stream may be further compressed and used for enhanced oil recovery, industrial applications, or for $CO_2$ sequestration. If a getter process is used for $CO_2$ purification, impurities such as oxygen and sulfur dioxide are removed by reaction with the getter, and the purified $CO_2$ stream may be further compressed and used in various applications. If a distillation process is used for $CO_2$ purification, $CO_2$ is produced as the bottom product and the non-condensables are removed as the overheads of the distillation column. Part of the $CO_2$ produced by distillation may be used to provide the purge in the $CO_2$ separation system 80; the rest is pumped to a higher pressure and used for various applications such as enhanced oil recovery or sequestration.

The non-condensables stream may be further purified by a membrane or an adsorption process to recover additional amounts of $CO_2$.

Example 1

A commercially available 5A zeolite of 8×12 mesh size, that is, about 1.5 mm was obtained from Aldrich Corporation and loaded in two 18 mm diameter adsorbent beds. The total weight of the adsorbent was about 500 gms. A feed stream containing about 12.5% $CO_2$ with the balance being nitrogen, to simulate flue gas from a coal fired power plant, was passed through these beds at a flow rate of 11 standard liters/min and at a pressure of 1.34 bara. The standard conditions refer to 21.1° C. and 1 bara. The adsorbent bed was cooled with a jacket containing a water/glycol mixture at 30° C. The regenerating bed was heated with a jacket containing water/glycol mixture at 100° C. The concentrations in the $CO_2$ depleted stream and in the $CO_2$ product were analyzed using an infrared $CO_2$ analyzer. The cycle for this method is shown in Table II below. After heating, the beds were evacuated to a pressure of about 0.25 bara during the evacuation steps. For these process conditions, an average $CO_2$ purity of 99.8% and an average $CO_2$ recovery of 85.8% were obtained.

TABLE II

Two Bed $CO_2$ Capture Process cycle

| Step # | Bed A | Bed B | Step Time Mins |
|---|---|---|---|
| 1 | Adsorption | Heating with evacuation | 8.0 |
| 2 | Equalization | Equalization | 1.0 |
| 3 | Rinse | Idle | 1.0 |
| 4 | Heating | Idle | 7.0 |
| 5 | Heating | Pressurization | 1.0 |
| 6 | Heating with evacuation | Adsorption | 8.0 |
| 7 | Equalization | Equalization | 1.0 |
| 8 | Idle | Rinse | 1.0 |
| 9 | Idle | Heating | 7.0 |
| 10 | Pressurization | Heating | 1.0 |

Example 2

The method of Example 1 was run at different adsorption temperatures. Other process conditions, namely the feed pressure, feed $CO_2$ concentration, and the adsorbent material were the same as in Example 1. Again, the concentrations in the $CO_2$ depleted stream and in the $CO_2$ product stream were analyzed using an infrared $CO_2$ analyzer. The process cycle of Table II was used. For a feed temperature of 20° C., an average $CO_2$ purity of 99.0% and an average $CO_2$ recovery of 88% were obtained. For a feed temperature of 40° C., an average $CO_2$ purity of 99.2% and an average $CO_2$ recovery of 84% were obtained.

Example 3

The method of Example 1 was run with a commercially available 13X zeolite of 8×12 mesh size, that is, 1.5 mm obtained from Aldrich Corporation. The feed pressure and the feed $CO_2$ concentration were the same as in Example 1 and the process cycle of Table II was used. Again, the concentrations in the $CO_2$ depleted stream and in the $CO_2$ product stream were analyzed using an infrared $CO_2$ analyzer. For a feed temperature of 20° C., an average $CO_2$ purity of 98.5% and an average $CO_2$ recovery of 87% were obtained. For a feed temperature of 30° C., an average $CO_2$ purity of 98.5% and an average $CO_2$ recovery of 78% were obtained.

Example 4

The beds containing 5A zeolite as in Example 1 were used (total weight of about 500 gms) with a feed stream containing about 3.4% $CO_2$ with the balance being nitrogen, to simulate the flue gas from a natural gas fired power plant. The feed was passed through these beds at a total flow rate of 17 standard liters/min. The adsorbing bed was cooled with a jacket containing a water/glycol mixture at 20° C. The process cycle in Table II was used. The regenerating bed was heated with a jacket containing water/glycol mixture at 100° C. The concentrations in the $CO_2$ depleted stream and in the $CO_2$ product were analyzed using an infrared $CO_2$ analyzer. For these process conditions, an average $CO_2$ purity of 91% and an average $CO_2$ recovery of 86% were obtained. The results of this example indicate that the method disclosed herein can provide reasonable purities and recoveries for streams containing very low levels of $CO_2$ such as that from a natural gas fired power plant.

Example 5

Commercially available F-200 activated alumina from Alcoa Inc., (1.5 mm size) was loaded in the beds of Example 1. The total weight of the adsorbent was about 300 gms. A feed stream saturated with water at 25° C. and containing about 12.5% $CO_2$ with the balance being nitrogen was passed through these beds at a total flow rate of 10 standard liters/min and at a pressure of 1.34 bara. The process cycle was designed to have an adsorption time of 5 minutes, a purge time of 4.5 minutes, and pressurization and depressurization time of 0.25 minutes each, and to retain most of the heat of water adsorption in the beds. The dry product exiting the adsorbent bed was used for purge after reducing the pressure to about atmospheric. The dew point of the product stream exiting the beds was monitored continuously and the product moisture concentration remained below 1 parts per million during a period of five days. Example 5 illustrates that under certain conditions the feed stream to the $CO_2$ separation system 80 can be dried to very low moisture levels to improve the $CO_2$ recovery in the $CO_2$ separation system 80. The purge gas in a process where the moisture is removed prior to $CO_2$ adsorption would be the $CO_2$ depleted stream from the $CO_2$ adsorption section.

Example 6

A commercially available 4A zeolite from UOP LLC with an average particle size of 3 mm and a silica gel with an average particle size of 3 mm from W. R. Grace & Company were used for removal of $SO_2$ and moisture from the feed. The feed was moisture saturated at a pressure of 1.2 bara and 25° C., contained 15% $CO_2$, and 50 parts per million (ppm) $SO_2$. This would be a typical feed after the flue gas desulfurization (FGD) unit in a coal fired power plant. The adsorption time was about 16 hours after which the bed was thermally regenerated at 200° C. The average $SO_2$ concentration in the regeneration outlet during the initial part of regeneration was about 1,500 ppm indicating an enrichment factor of about 30. In a coal fired power plant, this gas would be recycled to the existing FGD unit for near complete removal of $SO_2$. If the feed had contained mercury, a similar enrichment of mercury would be expected and the mercury enriched stream would be recycled to the existing mercury removal system. Both moisture and $SO_2$ concentrations in bed outlet during adsorption were less than 1 ppm.

Tests were also carried out with a water saturated feed containing 500 ppm $SO_2$ and 15% $CO_2$. This would represent a coal fired power plant that does not have a $SO_2$ removal system. UOP AW-500 zeolite was used for $SO_2$ removal in this case. The average $SO_2$ concentration in the regeneration outlet during the initial part of regeneration was over 10,000 ppm indicating an enrichment factor of over 20. In a coal fired power plant, this gas would be recycled to a new, much smaller flue gas desulfurization (FGD) unit, for nearly complete removal of $SO_2$. Both moisture and $SO_2$ concentrations in the bed outlet during adsorption were less than 1 ppm. Example 6 illustrates that under certain conditions the feed stream to the $CO_2$ separation system 80 exemplarily illustrated in FIG. 3, can be purified to very low moisture and $SO_2$ levels to improve the $CO_2$ recovery in the $CO_2$ separation system 80. The $SO_2$ and mercury enriched gas produced during regeneration can be recycled to existing or new $SO_2$ and mercury removal systems for nearly complete removal.

The results of these examples suggest that the methods disclosed herein can be used for recovering $CO_2$ from various process streams at a high purity level and a high recovery. Estimates of the energy consumption for this method indicate that the energy required to capture $CO_2$ for this method is about half the energy required for the amine based $CO_2$ capture method.

The method and system disclosed herein offers a number of advantages over the existing processes for the capture of $CO_2$. The method disclosed herein can be used both for retrofit applications as well as for new plants. Modifications required to a power plant for retrofit applications are significantly smaller than those needed for amine based $CO_2$ capture. The method disclosed herein is applicable to both coal fired and natural gas fired power plants. The method is also applicable to other streams such as the refinery and chemical process streams containing $CO_2$. Unlike absorption processes where nitrogen and sulfur oxides ($NO_X$ and $SO_X$) in the feed can react with the solvent irreversibly and require removal to below about 10 ppm levels, the $NO_X$ and $SO_X$ in the feed do not affect the adsorbent adversely. Oxygen in the feed has no effect on adsorbents unlike absorption based processes where oxygen degrades the amine solvent. The method disclosed herein provides a dry $CO_2$ product, eliminating the drying step prior to $CO_2$ compression and liquefaction, and the power and capital costs associated with the drying step. The method disclosed herein is also applicable to plants that do not have existing $SO_X$ and mercury removal systems. Although the methods and system disclosed herein are described with reference to specific examples, the scope of the method and system disclosed herein is not limited thereto. For example, the feed gas containing $CO_2$ can come from other processes such as a natural gas fired power plant or from a coal gasification plant.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method for separating carbon dioxide from a gas stream containing moisture and impurities, said method comprising:
    substantially removing said moisture and said impurities from said gas stream using one of a first temperature swing adsorption, a first pressure swing adsorption, a first vacuum swing adsorption, membrane separation, a first absorption, and any combination thereof, to produce a substantially moisture and impurities free gas stream;
    capturing said carbon dioxide from said substantially moisture and impurities free gas stream to produce a substantially dry carbon dioxide depleted stream and a substantially pure carbon dioxide product stream by one of a second temperature swing adsorption, a second pressure swing adsorption, a second vacuum swing adsorption, a second absorption with a non-aqueous solvent and with a chemical reaction, and said second absorption with said non-aqueous solvent and without a chemical reaction; and
    regenerating one or more of adsorbents and absorbents used during said removal of said moisture and said impurities using said substantially dry carbon dioxide depleted stream.

2. The method of claim 1, wherein said second absorption is performed using an absorbent comprising one of an ionic liquid and said non-aqueous solvent to produce a substantially pure carbon dioxide stream during regeneration of said absorbent.

3. The method of claim 2, wherein said substantially pure carbon dioxide stream is produced at a pressure between about 1 atmosphere and about 10 atmospheres by heating said absorbent indirectly in a heat exchanger.

4. The method of claim 1, wherein said first temperature swing adsorption is carried out in one of a fixed bed adsorber and a rotating bed adsorber during said removal of said moisture.

5. The method of claim 1, wherein said adsorbents used for said removal of said moisture and said capture of said carbon dioxide are in one of a particulate form and a structured form.

6. The method of claim 1, wherein said second temperature swing adsorption is conducted in an adsorbent bed comprising an adsorbent, wherein said second temperature swing adsorption comprises heating said adsorbent bed to produce a substantially moisture free carbon dioxide stream.

7. The method of claim 6, wherein said adsorbent comprises one or more of an activated carbon, carbon molecular sieves, 4A, 5A, 13X, NaY and CaX zeolites, metallorganic framework compounds, natural zeolites, modified natural and synthetic zeolites, modified activated carbon, and pillared clays.

8. The method of claim 1, wherein said second pressure swing adsorption and said second vacuum swing adsorption are conducted in an adsorbent bed comprising an adsorbent, wherein regeneration of said adsorbent bed comprises reducing pressure in said adsorbent bed to between about 0.01 atmosphere and about 1 atmosphere to produce a substantially moisture free carbon dioxide stream.

9. The method of claim 8, wherein said adsorbent comprises one or more of an activated carbon, carbon molecular sieves, 4A, 5A, 13X, NaY and CaX zeolites, metallorganic framework compounds, natural zeolites, modified natural and synthetic zeolites, modified activated carbon, and pillared clays.

10. The method of claim 1, wherein pressure of said gas stream is about 1.07 bar absolute to about 40 bar absolute, concentration of said carbon dioxide in said gas stream is about 3% to about 60% by volume, and temperature of said gas stream is about 10° C. to about 80° C.

11. The method of claim 1, wherein duration of said first temperature swing adsorption for said removal of said moisture from said gas stream is about 0.1 hour to about 12 hours, and wherein duration of said first pressure swing adsorption for said removal of said moisture from said gas stream is about 4 minutes to about 60 minutes.

12. The method of claim 1, wherein temperature during said regeneration of said adsorbents is increased from about 80° C. to about 300° C.

13. The method of claim 1, wherein duration of said second temperature swing adsorption for said capture of said carbon dioxide from said substantially moisture and impurities free gas stream is about 2 minutes to about 60 minutes.

14. The method of claim 1, wherein said adsorbents used for said removal of said moisture from said gas stream comprise one or more of an activated alumina, a silica gel, and a molecular sieve comprising a 3A, 4A, 5A and 13X zeolite.

15. The method of claim 1, wherein purity of a substantially moisture free carbon dioxide stream produced during one or more of said second temperature swing adsorption, said second pressure swing adsorption, said second vacuum swing adsorption, and said second absorption is about 90% to about 99%.

16. The method of claim 1, wherein said regeneration of said adsorbents comprises heating an adsorbent bed comprising said adsorbents indirectly using one of steam and a hot fluid in a heat exchanger to produce a substantially dry carbon dioxide stream.

17. The method of claim 1, wherein said impurities comprise hydrocarbons, sulfur oxides, and mercury.

18. The method of claim 1, wherein said impurities are removed from said gas stream using one of a physical adsorbent or a reactive adsorbent to produce a stream substantially depleted of said moisture and said impurities, said method further comprising:
  thermally regenerating said adsorbent using one of said stream substantially depleted of said moisture and said impurities or a moisture and impurities depleted stream from a downstream carbon dioxide removal process to produce a stream substantially enriched in said impurities; and
  substantially removing said impurities from said stream substantially enriched in said impurities using one of an existing feed conditioning unit and a new feed conditioning unit.

19. The method of claim 18, wherein said adsorbent used for said removal of said impurities from said gas stream comprises one or more of an activated carbon, 13X zeolites, A zeolites, an AW-300 zeolite, an AW-500 zeolite, impregnated aluminas, modified activated carbons, and silicates.

20. The method of claim 18, wherein said adsorbent is in one of a particulate form and a structured form.

21. The method of claim 18, wherein said adsorbent is used in one of a fixed bed adsorber and a rotating bed adsorber.

22. The method of claim 16, wherein temperature during said regeneration of said adsorbents is increased from about 80° C. to about 300° C.

* * * * *